United States Patent
Walton et al.

(10) Patent No.: US 7,184,743 B2
(45) Date of Patent: Feb. 27, 2007

(54) METHOD AND APPARATUS FOR ALLOCATING UPLINK RESOURCES IN A MULTIPLE-INPUT MULTIPLE-OUTPUT (MIMO) COMMUNICATION SYSTEM

(75) Inventors: Jay Rod Walton, Westford, MA (US); Mark S. Wallace, Bedford, MA (US); Steven J. Howard, Ashland, MA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 11/301,790

(22) Filed: Dec. 12, 2005

(65) Prior Publication Data

US 2006/0105761 A1 May 18, 2006

Related U.S. Application Data

(63) Continuation of application No. 09/859,346, filed on May 16, 2001, now Pat. No. 7,047,016.

(51) Int. Cl.
*H04B 1/16* (2006.01)

(52) U.S. Cl. ............... 455/343.4; 455/132; 455/185.1; 455/452.1

(58) Field of Classification Search ............. 455/343.4, 455/132, 185.1, 512, 166.2, 423, 67.11, 452.1, 455/450, 452.2; 370/335; 375/267
See application file for complete search history.

(56) References Cited

U.S. PATENT DOCUMENTS 6,236,646 B1 * 5/2001 Beming et al. ............. 370/335
7,110,378 B2 * 9/2006 Onggosanusi et al. ...... 370/334

\* cited by examiner

*Primary Examiner*—Matthew D. Anderson
*Assistant Examiner*—Tan Trinh
(74) *Attorney, Agent, or Firm*—Philip R. Wadsworth; Sandip (Micky) S. Minhas; Dmitry R. Milikovsky

(57) ABSTRACT

Techniques to schedule uplink data transmission for a number of terminals in a wireless communication system. In one method, a number of sets of terminals are formed for possible data transmission, with each set including a unique combination of terminals and corresponds to a hypothesis to be evaluated. The performance of each hypothesis is evaluated (e.g., based on channel response estimates for each terminal) and one of the evaluated hypotheses is selected based on the performance. The terminals in the selected hypothesis are scheduled for data transmission. A successive cancellation receiver processing scheme may be used to process the signals transmitted by the scheduled terminals. In this case, one or more orderings of the terminals in each set may be formed, with each terminal ordering corresponding to a sub-hypothesis to be evaluated. The performance of each sub-hypothesis is then evaluated and one of the sub-hypotheses is selected.

12 Claims, 11 Drawing Sheets

US 7,184,743 B2

METHOD AND APPARATUS FOR ALLOCATING UPLINK RESOURCES IN A MULTIPLE-INPUT MULTIPLE-OUTPUT (MIMO) COMMUNICATION SYSTEM

CLAIM OF PRIORITY UNDER 35 U.S.C. §120

The present application for patent is a Continuation and claims priority to patent application Ser. No. 09/859,346 entitled "METHOD AND APPARATUS FOR ALLOCATING UPLNK RESOURCES IN A MULTIPLE-INPUT MULTIPLE-PUTPUT (MIMO) COMMUNICATION SYSTEM" filed May 16, 2001, now U.S. Pat. No. 7,047,016, and assigned to the assignee hereof and hereby expressly incorporated by reference herein.

BACKGROUND

1. Field

The present invention relates generally to data communication, and more specifically to techniques for allocating uplink resources in a multiple-input multiple-output (MIMO) communication system, which may advantageously utilize channel state information (CSI) and may further employ successive cancellation (SC) receiver processing to provide improved system performance.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques.

A multiple-input multiple-output (MIMO) communication system employs multiple ($N_T$) transmit antennas and multiple ($N_R$) receive antennas for data transmission. In one common MIMO system implementation, the $N_T$ transmit antennas are located at and associated with a single transmitter system, and the $N_R$ receive antennas are similarly located at and associated with a single receiver system. A MIMO system may also be effectively formed for a multiple access communication system having a base station that concurrently communicates with a number of terminals. In this case, the base station employs a number of antennas and each terminal may employ one or more antennas.

A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

The available resources for uplink transmissions from the terminals to the base station are limited. Typically, only a fraction of the terminals may be scheduled for transmission on the available spatial subchannels, which may be limited by the number of antennas employed at the base station. Each "possible" spatial subchannel between a terminal and the base station typically experiences different link characteristics and is associated with different transmission capability. Efficient use of the available uplink resources (e.g., higher throughput) may be achieved if the available spatial subchannels are effectively allocated such that data is transmitted on these subchannels by a "proper" set of terminals in the MIMO system.

There is therefore a need in the art for techniques to allocate uplink resources in a MIMO system to provide improved system performance.

SUMMARY

Aspects of the invention provide techniques to increase the uplink performance of a wireless communication system. In an aspect, scheduling schemes are provided to schedule data transmissions from terminals that employ single antenna (i.e., SIMO terminals) and/or terminals that employ multiple antennas (i.e., MIMO terminals). By allowing multiple data transmissions to occur simultaneously (e.g., on the same frequency band) from multiple SIMO terminals, one or more MIMO terminals, or a combination thereof, the capacity of the system is increased relative to that achieved when only one terminal is allowed to transmit in a given time interval, as is typically performed in conventional time-division multiplexed (TDM) systems. The scheduling schemes are described in further detail below.

In another aspect, MIMO receiver processing techniques are used at the base station to increase system capacity. With MIMO, scheduled terminals transmit multiple independent data streams from a number of transmit antennas. If the propagation environment has sufficient scattering, the MIMO receiver processing techniques efficiently exploit the spatial dimensionality of the MIMO channel to support increased data rates for the terminals. At the MIMO receiver (i.e., the base station for the uplink), multiple receive antennas are used in conjunction with array signal processing techniques (described below) to recover the transmitted data streams from one or more terminals.

A specific embodiment of the invention provides a method for scheduling uplink data transmission for a number of terminals in a wireless communication system. In accordance with the method, a number of sets of terminals are formed for possible data transmission, with each set including a unique combination of terminals and corresponds to a hypothesis to be evaluated. The performance of each hypothesis is evaluated and one of the evaluated hypotheses is selected based on the performance. The hypotheses may be evaluated based in part on channel response estimates for each terminal in the hypothesis, with the channel response estimates being indicative of channel characteristics between the terminal and a base station. The terminals in the selected hypothesis are scheduled for data transmission.

A successive cancellation receiver processing scheme may be used to process the signals transmitted by the scheduled terminals. In this case, one or more orderings of the terminals in each set may be formed, with each terminal ordering corresponding to a sub-hypothesis to be evaluated. The performance of each sub-hypothesis is then evaluated and one of the sub-hypotheses is selected.

Each transmit antenna of each scheduled terminal may transmit an independent data stream. To achieve high performance, each data stream may be coded and modulated based on a scheme selected, for example, based on a signal-to-noise-plus-interference (SNR) estimate for the antenna used to transmit the data stream.

Terminals desiring data transmission (i.e., "active" terminals) may be prioritized based on various metrics and factors. The priority of the active terminals may then be used to select which terminal(s) to be considered for scheduling and/or to assign the available transmission channels and processing order to the selected terminals.

The invention further provides methods, systems, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
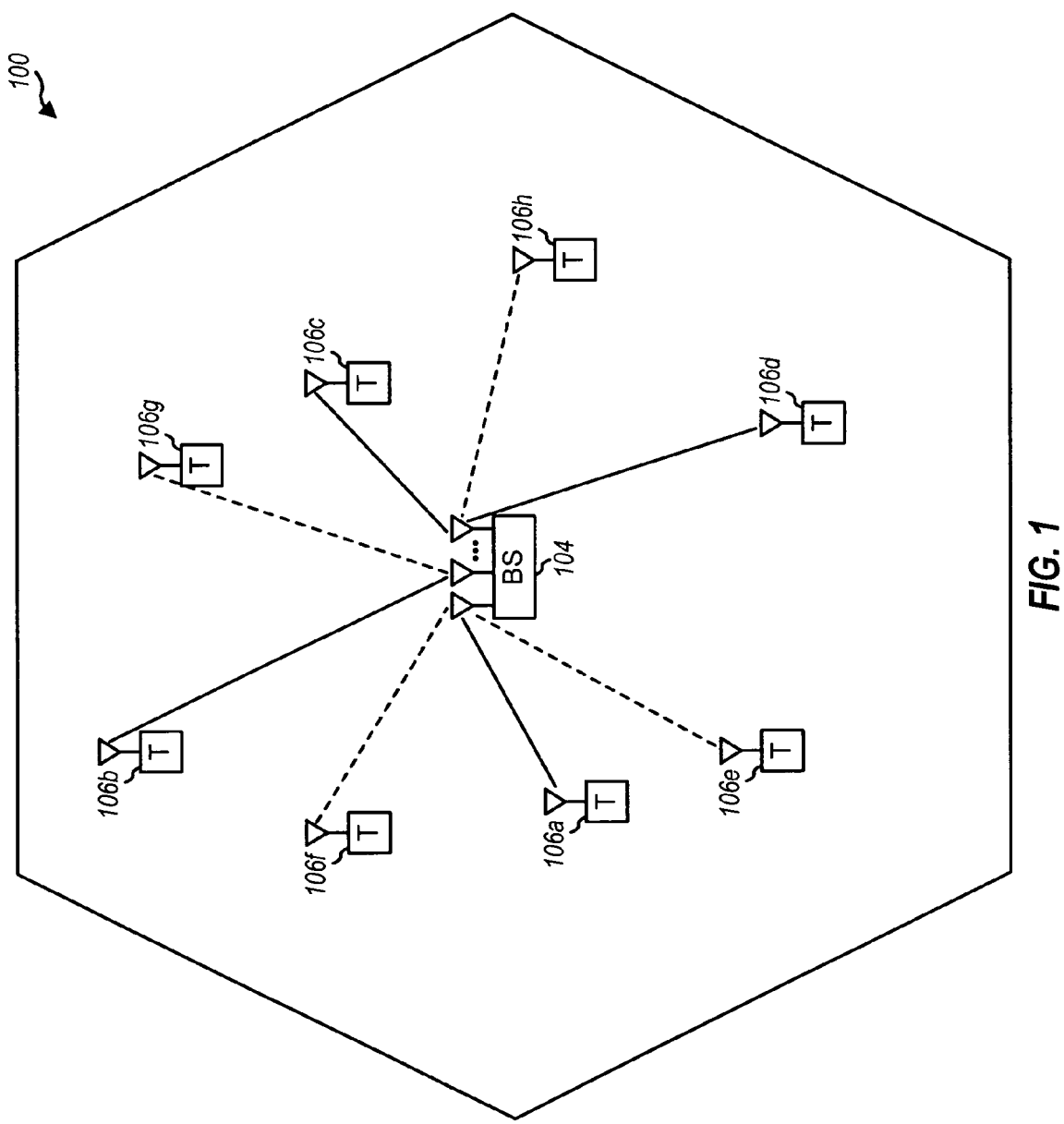
FIG. 1 is a diagram of a multiple-input multiple-output (MIMO) communication system that may be designed and operated to implement various aspects and embodiments of the invention.

FIG. 1 is a diagram of a multiple-input multiple-output (MIMO) communication system 100 that may be designed and operated to implement various aspects and embodiments of the invention. MIMO system 100 employs multiple ($N_T$) transmit antennas and multiple ($N_R$) receive antennas for data transmission. MIMO system 100 is effectively formed for a multiple access communication system having a base station (BS) 104 that concurrently communicates with a number of terminals (T) 106. In this case, base station 104 employs multiple antennas and represents the multiple-output (MO) for uplink transmissions and the multiple-input (MI) for downlink transmissions. The set of "communicating" terminals 106 collectively represents the multiple-input for uplink transmissions and the multiple-output for the downlink transmissions. A communicating terminal is one that transmits user-specific data to or receives user-specific data from the base station. If each communicating terminal 106 employs one antenna, then that antenna represents one of the $N_T$ transmit antennas if the terminal is transmitting data and one of the $N_R$ receive antennas if the terminal is receiving data. A terminal may also employ multiple antennas (not shown in FIG. 1 for simplicity), and these antennas may advantageously be used for data transmission.

MIMO system 100 may be operated to transmit data via a number of transmission channels. A MIMO channel may be decomposed into $N_C$ independent channels, with $N_C \leq \min\{N_T, N_R\}$. Each of the $N_C$ independent channels is also referred to as a spatial subchannel of the MIMO channel. For a MIMO system not utilizing orthogonal frequency division modulation (OFDM), there is typically only one frequency subchannel and each spatial subchannel may be referred to as a "transmission channel". For a MIMO system utilizing OFDM, each spatial subchannel of each frequency subchannel may be referred to as a transmission channel.

For the example shown in FIG. 1, base station 104 concurrently communicates with terminals 106a through 106d (as indicated by the solid lines) via multiple antennas available at the base station. Inactive terminals 106e through 106h may receive pilot references and other signaling information from base station 104 (as indicated by the dashed lines), but are not transmitting or receiving user-specific data to/from the base station. The downlink (i.e., forward link) refers to transmissions from the base station to the terminals, and the uplink (i.e., reverse link) refers to transmissions from the terminals to the base station.

MIMO system 100 may be designed to implement any number of standards and designs for CDMA, TDMA, FDMA, and other multiple access schemes. The CDMA standards include the IS-95, cdma2000, W-CDMA standards, and the TDMA standards include Global System for Mobile Communications (GSM). These standards are known in the art and incorporated herein by reference.

Aspects of the invention provide techniques to increase the performance of a wireless communication system. These techniques may be advantageously used to increase the uplink capacity of a multiple-access cellular system. In an aspect, scheduling schemes are provided to schedule data transmissions from terminals that employ single antenna (i.e., SIMO terminals) and/or terminals that employ multiple antennas (i.e., MIMO terminals). Both types of terminals may be supported simultaneously on the same carrier frequency. By allowing multiple data transmissions to occur simultaneously from multiple SIMO terminals, one or more MIMO terminals, or a combination thereof, the capacity of the system is increased relative to that achieved when only one terminal is allowed to transmit in a given time interval, as is typically performed in conventional time-division multiplexed (TDM) systems. The scheduling schemes are described in further detail below.

In another aspect, MIMO receiver processing techniques are used at the base station to increase system capacity. With MIMO, scheduled terminals transmit multiple independent data streams from a number of transmit antennas. If the propagation environment has sufficient scattering, the MIMO receiver processing techniques efficiently exploit the spatial dimensionality of the MIMO channel to support increased data rates for the terminals. At the MIMO receiver (i.e., the base station for the uplink), multiple receive antennas are used in conjunction with array signal processing techniques (described below) to recover the transmitted data streams from one or more terminals.

The MIMO receiver processing techniques can be used to increase the data rates of individual terminals, which correspondingly increases the capacity of the system. The MIMO receiver processing techniques can be used to process signals transmitted from multiple terminals equipped with single transmit antenna (e.g. SIMO terminals). From the base station's perspective, there is no discernable difference in processing N different signals from a single terminal (e.g., a single MIMO terminal) versus processing one signal from each of N different terminals (i.e., N SIMO terminals).

As shown in FIG. 1, the terminals may be randomly distributed in the base station's coverage area (or "cell"). Moreover, the link characteristics typically vary over time due to a number of factors such as fading and multipath. For simplicity, each terminal in the cell is assumed to be equipped with a single antenna. At a particular instant in time, the channel response between each terminal's antenna and the base station's array of $N_R$ receive antennas is characterized by a vector $\underline{h}_i$ whose elements are composed of independent Gaussian random variables, as follows:

$$\underline{h}_i = \begin{bmatrix} h_{i,1} \\ h_{i,2} \\ \vdots \\ h_{i,N_R} \end{bmatrix}, \quad \text{Eq (1)}$$

where $h_{i,j}$ is the channel response estimate from the i-th terminal to the j-th receive antenna at the base station. As shown in equation (1), the channel estimates for each terminal is a vector with $N_R$ elements corresponding to the number of receive antennas at the base station. Each element of the vector $\underline{h}_i$ describes the response for a respective transmit-receive antenna pair between the terminal and base station. For simplicity, equation (1) describes a channel characterization based on a flat fading channel model (i.e., one complex value for the entire system bandwidth). In an actual operating environment, the channel may be frequency selective (i.e., the channel response varies across the system bandwidth) and a more detailed channel characterization may be used (e.g., each element of the vector $\underline{h}_i$ may include a set of values for different frequency subchannels or time delays).

Also for simplicity, it is assumed that the average received power from each terminal is normalized to achieve a common target energy-per-bit-to-total-noise-plus-interference ratio ($E_b/N_t$) after signal processing at the base station. This target $E_b/N_t$ is often referred to as a power control setpoint (or simply, the setpoint) and is selected to provide a particular level of performance (e.g., a particular packet error rate (PER)). The common setpoint may be achieved by a closed loop power control mechanism in which the transmit power of each transmitting terminal may be adjusted (e.g., based on a power control signal from the base station). Alternatively, a unique setpoint may also be used for each terminal and the techniques described herein may be generalized to cover this operating mode. Also, it is assumed that simultaneous transmissions from different terminals are synchronized so that the transmissions arrive at the base station within a prescribed time window.

The base station periodically estimates the channel response for "active" terminals, which are terminals desiring to transmit data during an upcoming or a future transmission interval. Active terminals may include terminals that are currently transmitting. The channel estimates may be facilitated in a number of ways such as, for example, with the use of pilot and/or data decision directed techniques, as described in further detail below.

Based on the available channel estimates, various scheduling schemes may be designed to maximize the uplink throughput by scheduling and assigning terminals to the available transmission channels such that they are allowed to transmit simultaneously. A scheduler can be designed and used to evaluate which specific combination of terminals provides the best system performance (e.g., the highest throughput) subject to any system constraints and requirements. By exploiting the spatial (and possibly frequency) "signatures" of the individual terminals (i.e., their channel response estimates), the average uplink throughput can be increased relative to that achieved with a single terminal. Furthermore, by exploiting the multi-user diversity, the scheduler can find combinations of "mutually compatible" terminals that can be allowed to transmit at the same time on the same channel, effectively enhancing system capacity relative to single-user scheduling or random scheduling for multiple users.

The terminals may be selected for data transmission based on various factors. One set of factors may relate to system constraints and requirements such as the desired quality of service (QoS), maximum latency, average data rate, and so on. Some or all of these factors may need to be satisfied on a per terminal basis (i.e., for each terminal) in a multiple access system. Another set of factors may pertain to system performance, which may be quantified by the average system throughput rate or some other indications of performance. These various factors are described in further detail below.

The scheduling schemes are designed to select the best combination of terminals for simultaneously transmission on the available transmission channels such that system performance is maximized while conforming to the system constraints and requirements. If $N_T$ terminals are selected for transmission and each terminal employs one antenna, the channel response matrix H corresponding to the selected set of terminals ($\underline{u} = \{u_1, u_2, \ldots u_{N_T}\}$) may be expressed as:

$$H = [\underline{h}_1 \underline{h}_2 \ldots \underline{h}_{N_T}] = \begin{bmatrix} h_{1,1} & h_{2,1} & \cdots & h_{N_T,1} \\ h_{1,2} & h_{2,2} & \cdots & h_{N_T,2} \\ \vdots & \vdots & & \vdots \\ h_{1,N_R} & h_{2,N_R} & \cdots & h_{N_T,N_R} \end{bmatrix}. \quad \text{Eq (2)}$$

In accordance with an aspect of the invention, a successive equalization and interference cancellation (or "successive cancellation") receiver processing technique is used at the base station to receive and process the transmissions from multiple terminals. This technique successively processes the $N_R$ received signals a number of times (or iterations) to recover the signals transmitted from the terminals, with one transmitted signal being recovered for each iteration. For each iteration, the technique performs linear or non-linear processing (i.e., spatial or space-time equalization) on the $N_R$ received signals to recover one of the transmitted signals, and cancels the interference due to the recovered signal from the received signals to derive "modified" signals having the interference component removed. The modified signals are then processed by the next iteration to recover another transmitted signal. By removing the interference due to each recovered signal from the received signals, the SNR improves for the transmitted signals included in the modified signals but not yet recovered. The improved SNR corresponds to improved performance for the terminal as well as the system. The successive cancellation receiver processing technique is described in further detail below.

When using the successive cancellation receiver processing technique to process the received signals, the SNR associated with each transmitting terminal is a function of the particular order in which the terminals are processed at the base station. In an aspect, the scheduling schemes take this into account in selecting the set of terminals to allow transmission.

Figure 2:
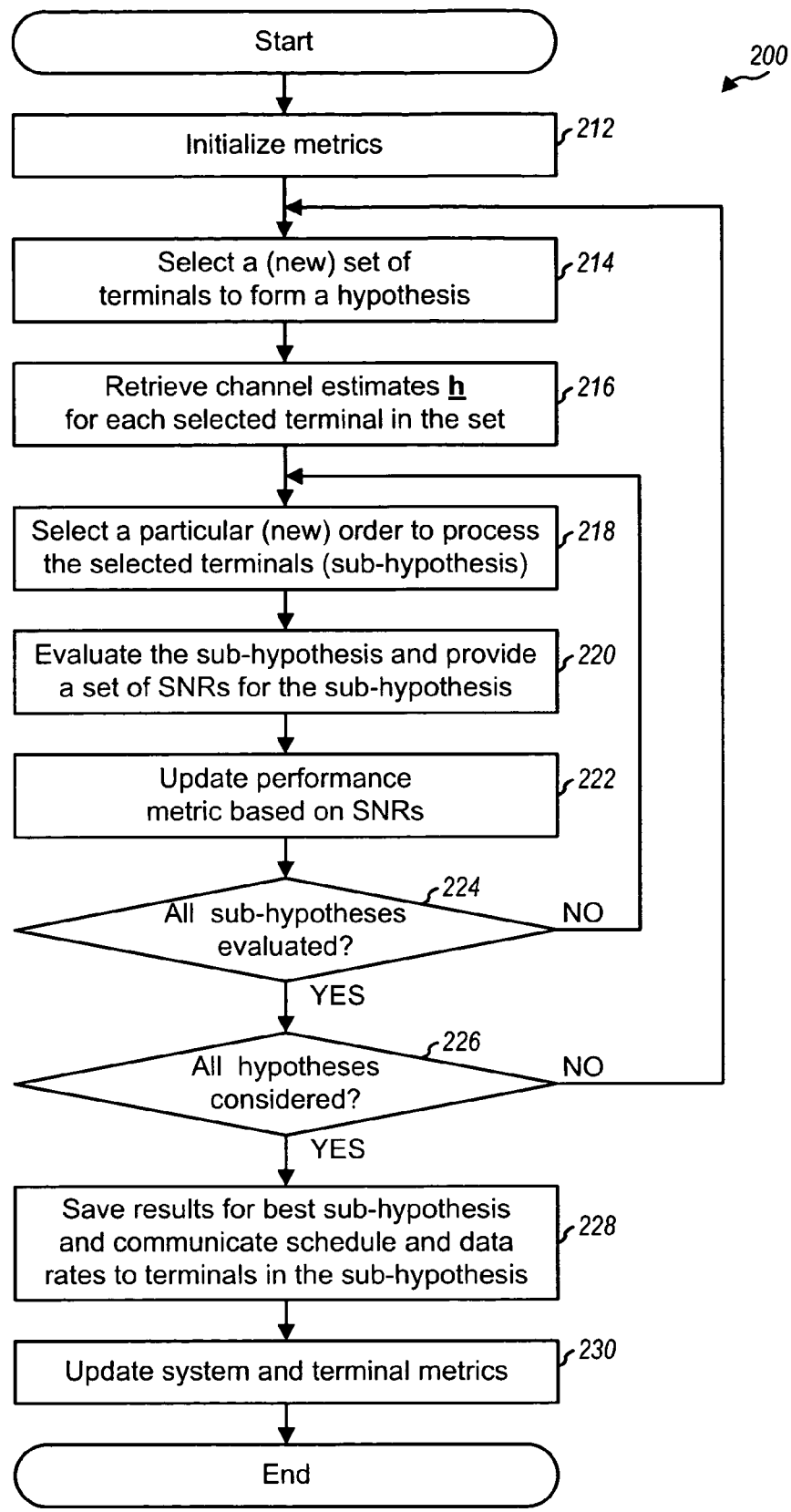
FIG. 2 is a flow diagram of a process to schedule terminals for transmission, in accordance with an embodiment of the invention.

FIG. 2 is a flow diagram of a process 200 to schedule terminals for transmission, in accordance with an embodiment of the invention. For clarity, the overall process is first described and the details for some of the steps in the process are described subsequently.

Initially, the metrics to be used to select the "best" set of terminals for transmission are initialized, at step 212. Various performance metrics may be used to evaluate the terminal selections and some of these are described in further detail below. For example, a performance metric that maximizes system throughput may be used. Also, terminal metrics such as SNRs for the transmitted signals after processing at the base station (i.e., the "post-processed" signals) may also be used in the evaluation.

A (new) set of active terminals is then selected from among all active terminals desiring to transmit data in the upcoming transmission interval, at step 214. Various techniques may be used to limit the number of active terminals to be considered for scheduling, as described below. The specific set of terminals selected (e.g., $\underline{u}=\{u_a, u_b, \ldots u_{Nt}\}$) forms a hypothesis to be evaluated. For each selected terminal $u_i$ in the set, the channel estimates vector $\underline{h}_i$ is retrieved, at step 216.

When the successive cancellation receiver processing technique is used at the base station, the order in which the terminals are processed directly impacts their performance. Thus, a particular (new) order is selected to process the terminals in the set, at step 218. This particular order forms a sub-hypothesis to be evaluated.

The sub-hypothesis is then evaluated and the terminal metrics for the sub-hypothesis are provided, at step 220. The terminal metrics may be the SNRs for the (post-processed) signals hypothetically transmitted from the terminals in the set. Step 220 may be achieved based on the successive cancellation receiver processing technique, which is described below in FIGS. 3A and 3B. The performance metric (e.g., the system throughput) corresponding to this sub-hypothesis is then determined (e.g., based on the SNRs for the post-processed signals from the terminals), at step 222. This performance metric is then used to update the performance metric corresponding to the current best sub-hypothesis, also at step 222. Specifically, if the performance metric for this sub-hypothesis is better than that of the current best sub-hypothesis, then this sub-hypothesis becomes the new best sub-hypothesis and the performance and terminal metrics corresponding to this sub-hypothesis are saved.

A determination is then made whether or not all sub-hypotheses for the current hypothesis have been evaluated, at step 224. If all sub-hypotheses have not been evaluated, the process returns to step 218 and a different and not yet evaluated order for the terminals in the set is selected for evaluation. Steps 218 through 224 are repeated for each sub-hypothesis to be evaluated.

If all sub-hypotheses for a particular hypothesis have been evaluated, at step 224, a determination is made whether or not all hypotheses have been considered, at step 226. If all hypotheses have not been considered, the process returns to step 214 and a different and not yet considered set of terminals is selected for evaluation. Steps 214 through 226 are repeated for each hypothesis to be considered.

If all hypotheses for the active terminals have been considered, at step 226, then the results for the best sub-hypothesis are saved, the data rates for the terminals in the best sub-hypothesis are determined (e.g., based on their SNRS), and the scheduled transmission interval and data rates are communicated to the terminals prior to the scheduled transmission interval, at step 228. If the scheduling scheme requires other system and terminal metrics to be maintained (e.g. the average data rate over the past K transmission intervals, latency for data transmission, and so on), then these metrics are updated, at step 230. The terminal metrics may be used to evaluate the performance of the individual terminals, and are described in further detail below. The scheduling is typically performed for each transmission interval.

Figure 3A:
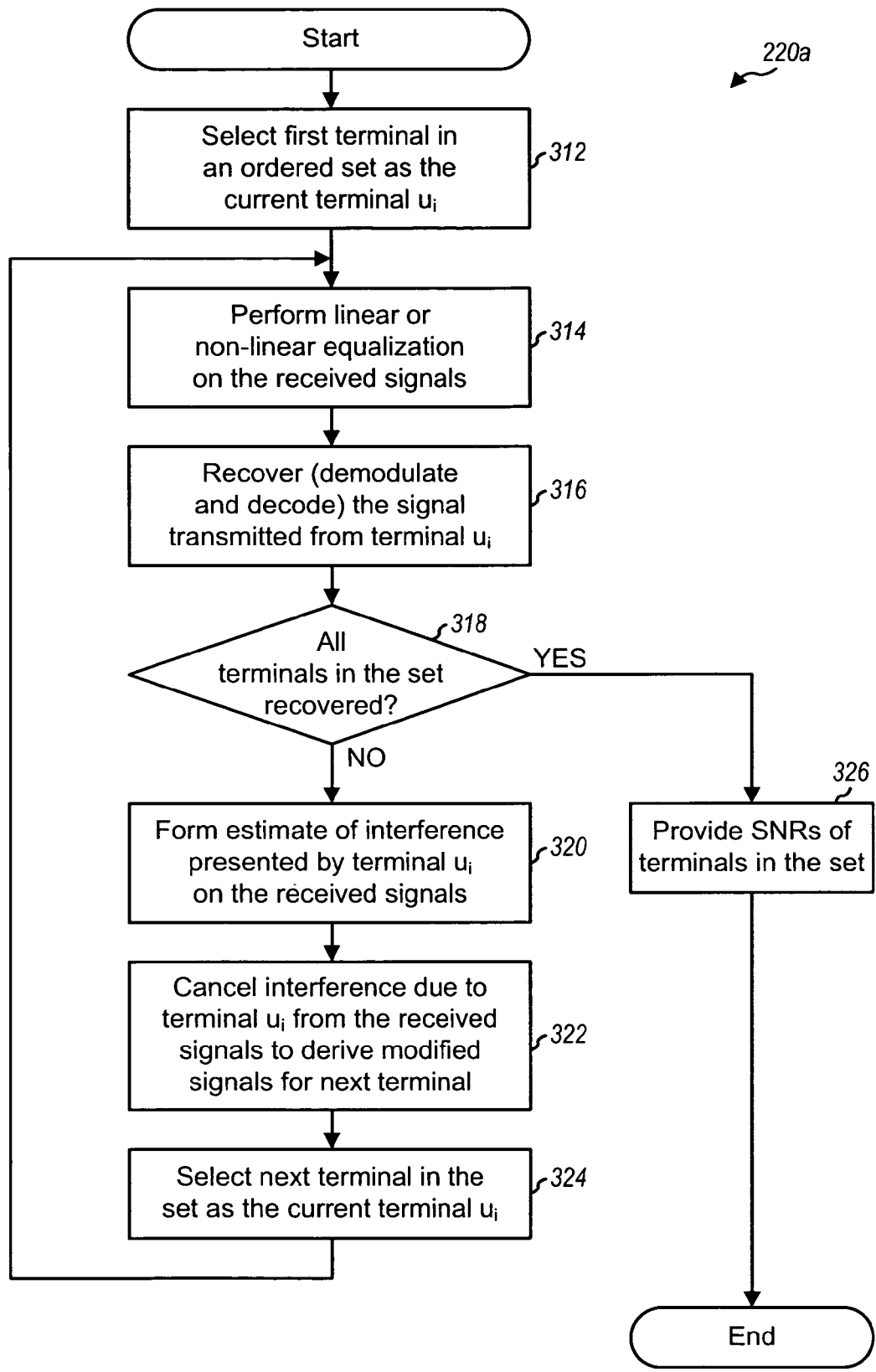
FIGS. 3A and 3B are flow diagrams for two successive cancellation (SC) receiver processing schemes whereby the processing order is (1) imposed by an ordered set of terminals and (2) determined based on the post-processed SNRs, respectively.

FIG. 3A is a flow diagram for a successive cancellation receiver processing scheme 220a whereby the processing order is imposed by an ordered set of terminals. This flow diagram may be used for step 220 in FIG. 2. The processing shown in FIG. 3A is performed for a particular sub-hypothesis, which corresponds to an ordered set of terminals (e.g., $\underline{u}=\{u_a, u_b, \ldots u_{Nt}\}$). Initially, the first terminal in the ordered set is selected as the current terminal to be processed (i.e., $u_i=u_a$), at step 312.

For the successive cancellation receiver processing technique, the base station first performs linear (i.e., spatial) or non-linear (i.e., space-time) equalization on the received signals to attempt to separate the individual signals transmitted by the terminals in the set, at step 314. The linear or non-linear equalization may be achieved as described below. The amount of achievable signal separation is dependent on the amount of correlation between the signals transmitted, and greater signal separation may be obtained if these signals are less correlated. Step 314 provides $N_T$ post-processed signals corresponding to the $N_T$ signals transmitted by the terminals in the set. As part of the linear or non-linear processing, the SNR corresponding to the post-processed signal for the current terminal $u_i$ is also determined (e.g., in a manner described below).

The post-processed signal corresponding to terminal $u_i$ is then further processed (i.e., "detected") to obtain a decoded data stream for the terminal, at step 316. The detection may include demodulating, deinterleaving, and decoding the post-processed signal to derive the decoded data stream.

At step 318, a determination is made whether or not all terminals in the set have been processed. If all terminals have been processed, then the SNRs of the terminals are provided, at step 326, and the receiver processing terminates. Otherwise, the interference due to terminal $u_i$ on each of the received signals is estimated, at step 320. The interference may be estimated (e.g., as described below) based on the channel response matrix H for the terminals in the set. The estimated interference due to terminal $u_i$ is then subtracted from the received signals to derive modified signals, at step 322. These modified signals represent estimates of the received signals if terminal $u_i$ had not transmitted (i.e., assuming that the interference cancellation was effectively performed). The modified signals are used in the next iteration to process the transmitted signal for the next terminal in the set. The next terminal in the set is then selected as the current terminal $u_i$, at step 324. In particular, $u_i=u_b$ for the second iteration, $u_i=u_c$ for the third iteration, and so on, for the ordered set $\underline{u}=\{u_a, u_b, \ldots u_{Nt}\}$.

The processing performed in steps 314 and 316 is repeated on the modified signals (instead of the received signals) for each subsequent terminal in the set. Steps 320 through 324 are also performed for each iteration except for the last iteration.

Using the successive cancellation receiver processing technique, for each hypothesis of $N_T$ terminals, there are $N_T$ factorial possible orderings (e.g., $N_T!=24$ if $N_T=4$). For each ordering of terminals within a given hypothesis (i.e., each sub-hypothesis), the successive cancellation receiver processing (step 220) provides a set of SNRs for the post-processed signals for the terminals, which may be expressed as:

$$\gamma_{hyp,order} = \{\gamma_1, \gamma_2, \ldots, \gamma_{N_T}\},$$

where $\gamma_i$ is the SNR after the receiver processing for the i-th terminal in the sub-hypothesis.

Each sub-hypothesis is further associated with a performance metric, $R_{hyp,order}$, which may be a function of various factors. For example, a performance metric based on the SNRs of the terminals may be expressed as:

$$R_{hyp,order} = f(\gamma_{hyp,order}),$$

where $f(\cdot)$ is a particular positive real function of the arguments within the parenthesis.

Various functions may be used to formulate the performance metric. In one embodiment, a function of the achievable throughputs for all $N_T$ terminals for the sub-hypothesis may be used, which may be expressed as:

$$f(\gamma_{hyp,order}) = \sum_{i=1}^{N_T} r_i, \quad \text{Eq (3)}$$

where $r_i$ is the throughput associated with the i-th terminal in the sub-hypothesis, and may be expressed as:

$$r_i = c_i \cdot \log_2(1+\gamma_i), \quad \text{Eq (4)}$$

where $c_i$ is a positive constant that reflects the fraction of the theoretical capacity achieved by the coding and modulation scheme selected for this terminal.

For each sub-hypothesis to be evaluated, the set of SNRs provided by the successive cancellation receiver processing may be used to derive the performance metric for that sub-hypothesis, e.g., as shown in equations (3) and (4). The performance metric computed for each sub-hypothesis is compared to that of the current best sub-hypothesis. If the performance metric for a current sub-hypothesis is better, then that sub-hypothesis and the associated performance metric and SNRs are saved as the metrics for the new best sub-hypothesis.

Once all sub-hypotheses have been evaluated, the best sub-hypothesis is selected and the terminals in the sub-hypothesis are scheduled for transmission in an upcoming transmission interval. The best sub-hypothesis is associated with a specific set of terminals. If successive cancellation receiver processing is used at the base station, the best sub-hypothesis is further associated with a particular receiver processing order at the base station. In all cases, the sub-hypothesis is further associated with the achievable SNRs for the terminals, which may be determined based on the selected processing order.

The data rates for the terminals may then be computed based on their achieved SNRs, as shown in equation (4). Partial-CSI (which may comprise the data rates or the SNRs) may be reported to the scheduled terminals, which then use the partial-CSI to accordingly adjust (i.e., adapt) their data processing to achieve the desired level of performance.

The first scheduling scheme described in FIGS. 2 and 3A represents a specific scheme that evaluates all possible orderings of each possible set of active terminals desiring to transmit data in the upcoming transmission interval. The total number of potential sub-hypotheses to be evaluated by a scheduler can be quite large, even for a small number of active terminals. In fact, the total number of sub-hypotheses can be expressed as:

$$N_{sub-hyp} = N_T! \binom{N_U}{N_T} = \frac{N_U!}{(N_U - N_T)!}, \quad \text{Eq (5)}$$

where $N_U$ is the number of active terminals to be considered for scheduling. For example, if $N_U=8$ and $N_T=4$, then $N_{sub-hyp}=1680$. An exhaustive search may be used to determine the sub-hypothesis that provides the optimal system performance, as quantified by the performance metric used to select the best sub-hypothesis.

A number of techniques may be used to reduce the complexity of the processing to schedule terminals. Some scheduling schemes based on some of these techniques are described below. Other schemes may also be implemented and are within the scope of the invention. These schemes may also provide high system performance while reducing the amount of processing required to schedule terminals.

In a second scheduling scheme, the terminals included in each hypothesis to be evaluated are processed in a particular order that is determined based on a particular defined rule. This scheme relies on the successive cancellation receiver processing to determine the specific ordering for processing the terminals in the hypothesis. For example and as described below, for each iteration, the successive cancellation receiver processing scheme can recover the transmitted signal having the best SNR after equalization. In this case, the ordering is determined based on the post-processed SNRs for the terminals in the hypothesis.

Figure 3B:
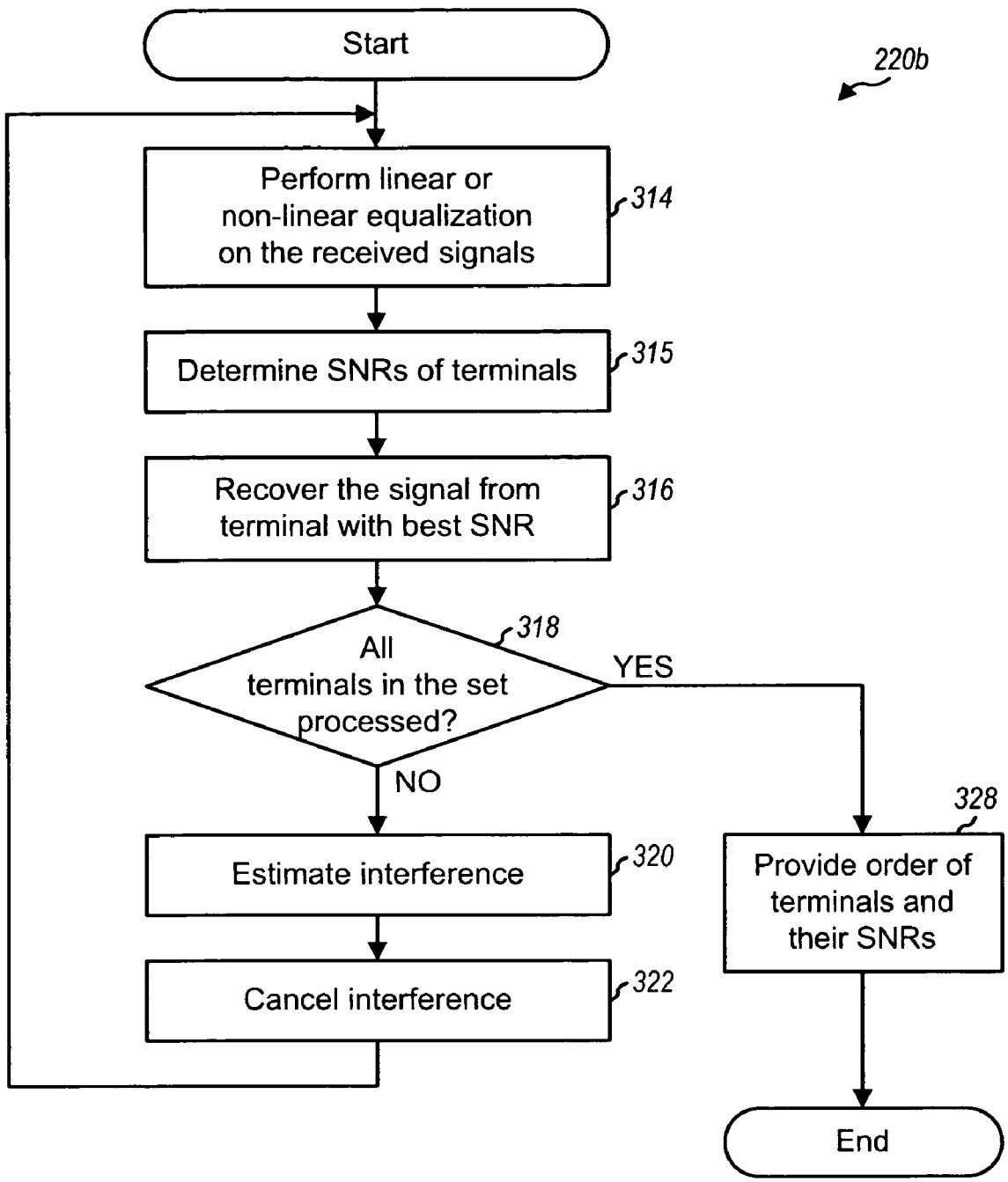

FIG. 3B is a flow diagram for a successive cancellation receiver processing scheme 220b whereby the processing order is determined based on the post-processed SNRS. This flow diagram may also be used for step 220 in FIG. 2. However, since the processing order is determined based on the post-processed SNRs generated by the successive cancellation receiver processing, only one sub-hypothesis is effectively evaluated for each hypothesis and steps 218 and 224 in FIG. 2 may be omitted.

Initially, linear or non-linear equalization is performed on the received signals to attempt to separate the individual transmitted signals, at step 314. The SNRs of the transmitted signals after the equalization are then estimated (e.g., as described below), at step 315. In an embodiment, the transmitted signal corresponding to the terminal with the best SNR is selected and further processed (i.e., demodulated and decoded) to obtain a decoded data stream for the terminal, at step 316. At step 318, a determination is made whether or not all terminals in the hypothesis have been processed. If all terminals have been processed, then the order of the terminals and their SNRs are provided, at step 328, and the receiver processing terminates. Otherwise, the interference due to the terminal just processed is estimated, at step 320. The estimated interference is then subtracted from the received signals to derive the modified signals, at step 322. Steps 314, 316, 318, 320, and 322 in FIG. 3B correspond to identically numbered steps in FIG. 3A.

In a third scheduling scheme, the terminals included in each hypothesis are processed based on a specific order. With successive cancellation receiver processing, the SNR of an unprocessed terminals improves with each iteration, as the interference from each processed terminals is removed. Thus, on average, the first terminal to be processed will have the lowest SNR, the second terminal to be processed will have the second to lowest SNR, and so on. Using this knowledge, the processing order for the terminals may be specified for a hypothesis.

In one embodiment of the third scheduling scheme, the ordering for each hypothesis to be evaluated is based on the priority of the terminals in the hypothesis. Various factors may be used to determine the priority of the terminals, and some of these factors are described below. In this embodiment, the lowest priority terminal in the hypothesis may be processed first, the next lowest priority terminal may be processed next, and so on, and the highest priority terminal may be processed last. This embodiment allows the highest priority terminal to achieve the highest SNR possible for the hypothesis, which supports the highest possible data rate. In this manner, the assignment of data rates to terminals may be effectively performed in order based on priority (i.e., the highest priority terminal is assigned the highest possible data rate).

In another embodiment of the third scheduling scheme, the ordering for each hypothesis to be considered is based on the user payload, latency requirements, emergency service priority, and so on.

In a fourth scheduling scheme, the terminals are scheduled based on their priority. The priority of each terminal may be derived based on one or more metrics (e.g., average throughput), system constraints and requirements (e.g., maximum latency), other factors, or a combination thereof, as described below. A list may be maintained for all active terminals desiring to transmit data in the upcoming transmission interval (which is also referred to as a "frame"). When a terminal desires to transmit data, it is added to the list and its metrics are initialized (e.g., to zero). The metrics of each terminal in the list are thereafter updated on each frame. Once a terminal no longer desires to transmit data, it is removed from the list.

For each frame, a number of terminals in the list may be considered for scheduling. The particular number of terminals to be considered may be based on various factors. In one embodiment, only the $N_T$ highest priority terminals are selected to transmit on the $N_T$ available transmission channels. In another embodiment, the $N_X$ highest priority terminals in the list are considered for scheduling, with $N_U > N_X > N_T$.

Figure 4:
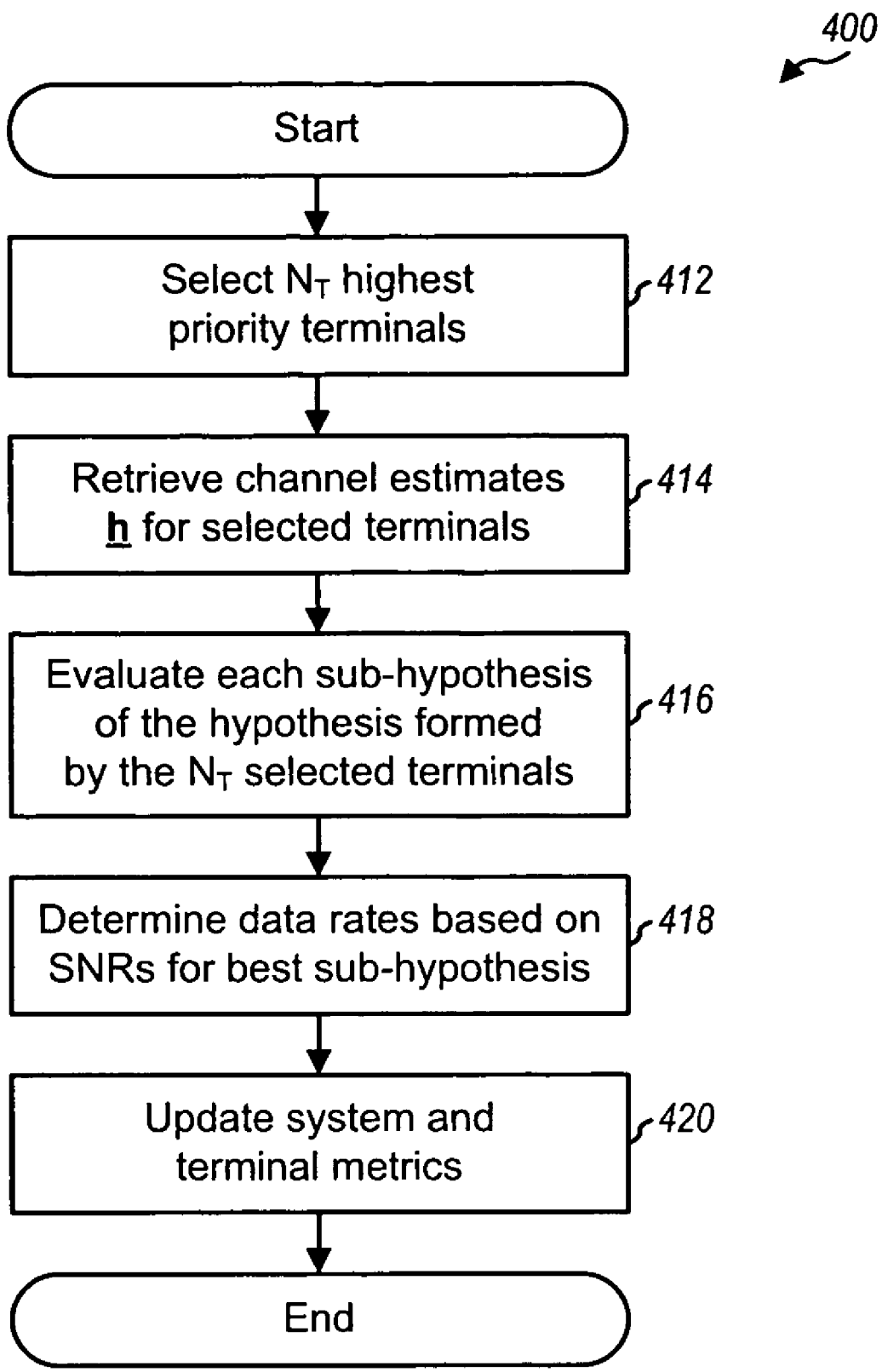
FIG. 4 is a flow diagram for a priority-based scheduling scheme whereby the highest priority terminals are considered for scheduling.

FIG. 4 is a flow diagram for a priority-based scheduling scheme 400 whereby $N_T$ highest priority terminals are considered for scheduling, in accordance with an embodiment of the invention. At each frame interval, the scheduler examines the priority for all active terminals in the list and selects the $N_T$ highest priority terminals, at step 412. In this embodiment, the remaining ($N_U - N_T$) terminals in the list are not considered for scheduling. The channel estimates $\underline{h}$ for each selected terminal are retrieved, at step 414. Each sub-hypothesis of the hypothesis formed by the $N_T$ selected terminals is evaluated, and the corresponding vector of SNRS, $\underline{\gamma}_{hyp,order}$, for the post-processed signals for each sub-hypothesis is derived, at step 416. The best sub-hypothesis is selected, and data rates corresponding to the SNRs of the best sub-hypothesis are determined, at step 418. Again, the scheduled transmission interval and the data rates may be reported to the terminals in the hypothesis. The metrics of the terminals in the list and system metrics are then updated, at step 420. In one embodiment, the best sub-hypothesis may correspond to the one that comes closest to normalizing the priority of the terminals after their metrics are updated.

Various metrics and factors may be used to determine the priority of the active terminals. In an embodiment, a "score" may be maintained for each terminal in the list and for each metric to be used for scheduling. In one embodiment, a score indicative of an average throughput over a particular averaging time interval is maintained for each active terminal. In one implementation, the score $\phi_n(k)$ for terminal $u_n$ at frame k is computed as a linear average throughput achieved over some time interval, and can be expressed as:

$$\phi_n(k) = \frac{1}{K} \sum_{i=k-K+1}^{k} r_n(i)/r_{\max}, \qquad \text{Eq (6)}$$

where $r_n(i)$ is the realized data rate (in unit of bits/frame) for terminal $u_n$ at frame i and may be computed as shown in equation (4). Typically, $r_n(i)$ is bounded by a particular maximum achievable data rate, $r_{max}$, and a particular minimum data rate (e.g., zero). In another implementation, the score $\phi_n(k)$ for terminal $u_n$ in frame k is an exponential average throughput achieved over some time interval, and can be expressed as $$\phi_n(k) = (1-\alpha) \cdot \phi_n(k-1) + \alpha \cdot r_n(k)/r_{\max}, \qquad \text{Eq (7)}$$

where $\alpha$ is a time constant for the exponential averaging, with a larger value for $\alpha$ corresponding to a longer averaging time interval.

When a terminal desires to transmit data, it is added to the list and its score is initialized to zero. The score for each terminal in the list is subsequently updated on each frame. Whenever a terminal is not scheduled for transmission in a frame, its data rate is set to zero (i.e., $r_n(k)=0$) and its score is updated accordingly. If a frame is received in error by a terminal, the terminal's effective data rate for that frame is also set to zero. The frame error may not be known immediately (e.g., due to round trip delay of an acknowledgment/negative acknowledgment (Ack/Nak) scheme used for the data transmission) but the score can be adjusted accordingly once this information is available.

The priority for the active terminals may also be determined based in part on system constraints and requirements. For example, if the maximum latency for a particular terminal exceeds a threshold value, then the terminal may be elevated to a high priority.

Other factors may also be considered in determining the priority of the active terminals. One such factor may be related to the type of data to be transmitted by the terminals. Delay sensitive data may be associated with higher priority, and delay insensitive may be associated with lower priority. Retransmitted data due to decoding errors for a prior transmission may also be associated with higher priority since other processes may be awaiting the retransmitted data. Another factor may be related to the type of data service being provided for the terminals. Other factors may also be considered in determining priority and are within the scope of the invention.

The priority of a terminal may be a function of any combination of (1) the score maintained for the terminal for each metric to be considered, (2) other parameter values maintained for system constraints and requirements, and (3) other factors. In one embodiment, the system constraints and requirements represent "hard values" (i.e., high or low priority, depending on whether or not the constraints and requirements have been violated) and the scores represent "soft values". For this embodiment, terminals for which the system constraints and requirements have not been met are immediately considered, along with other terminals based on their scores.

A priority-based scheduling scheme may be designed to achieve equal average throughput (i.e., equal QoS) for all terminals in the list. In this case, active terminals are prioritized based on their achieved average throughput, which may be determined as shown in equation (6) or (7). In this priority-based scheduling scheme, the scheduler uses the scores to prioritize terminals for assignment to the available transmission channels. The active terminals in the list may be prioritized such that the terminal with the lowest score is given the highest priority, and the terminal with the highest score is given the lowest priority. Other methods for ranking terminals may also be used. The prioritization may also assign non-uniform weighting factors to the terminal scores.

For a scheduling scheme in which terminals are selected and scheduled for transmission based on their priority, it is possible for poor terminal groupings to occur occasionally. A "poor" terminal set is one that results in strong linear dependence in that hypothesized channel response matrix H, which then results in low overall throughput for each terminal in the set. When this happen, the priorities of the terminals may not change substantially over several frames. In this way, the scheduler may be stuck with this particular terminal set until the priorities change sufficiently to cause a change in membership in the set.

To avoid the above-described "clustering" effect, the scheduler can be designed to recognize this condition prior to assigning terminals to the available transmission channels, and/or detect the condition once it has occurred. A number of different techniques may be used to determine the degree of linear dependence in the hypothesized matrix H. These techniques include solving for the eigenvalues of H, solving for the SNRs of the post-processed signals using a successive cancellation receiver processing technique or a linear spatial equalization technique, and others. In addition, detection of this clustering condition is typically simple to implement. In the event that the clustering condition is detected, the scheduler can reorder the terminals (e.g., in a random manner) in an attempt to reduce the linear dependence in the matrix H. A shuffling scheme may also be devised to force the scheduler to select terminal sets that result in "good" hypothesized matrices H (i.e., ones that have minimal amount of linear dependence).

For priority-based scheduling schemes (e.g., the third and fourth schemes described above), the scores of the terminals are updated based on their assignments or non-assignments to transmission channels. In an embodiment, for all scheduling schemes, the supported data rates for the terminals are determined based on their SNRs and communicated to the terminals for use in the scheduled transmission interval. In this manner, the scheduled terminals can transmit at the data rates supported by the SNRs estimated for the terminals. The base station also knows which terminals to process in a given frame and in what order to process them.

Some of the scheduling schemes described above employ techniques to reduce the amount of processing required to schedule terminals. These and other techniques may also be combined to derive other scheduling schemes, and this is within the scope of the invention. For example, the $N_X$ highest priority terminals may be considered for scheduling using the first, second, or third scheme.

More complex scheduling schemes may also be devised that may be able to achieve throughput closer to optimum. These schemes may be required to evaluate a larger number of hypotheses and sub-hypotheses' in order to determine the best set of terminals for data transmission on a given channel (i.e., a time slot, a code channel, a frequency subchannel, and so on). Other scheduling schemes may also be designed to take advantage of the statistical distribution of the data rates achieved by each order of processing, as described above. This information may be useful in reducing the number of hypotheses to be evaluated. In addition, for some applications, it may be possible to learn which terminal groupings (i.e., hypotheses) work well by analyzing performance over time. This information may then be stored, updated, and used by the scheduler in future scheduling intervals.

For simplicity, various aspects and embodiments of the invention have been described for a communication system in which (1) $N_T$ terminals are selected for transmission, with each terminal employing a single transmit antenna, (2) the number of transmit antennas is equal to the number of receive antennas (i.e., $N_T=N_R$), and (3) one receive antenna is used for each scheduled terminal. In this operating mode, each terminal is effectively assigned to a respective available spatial subchannel of the MIMO channel.

The terminals may also share the multiplex array of receive antennas, and this is within the scope of the invention. In this case, the number of transmit antennas for the scheduled terminals may be greater than the number of receive antennas at the base station, and the terminals would share the available transmission channels using another multiple access technique. The sharing may be achieved via time division multiplexing (e.g., assigning different fractions of a frame to different terminals), frequency division multiplexing (e.g., assigning different frequency subchannels to different terminals), code division multiplexing (e.g., assigning different orthogonal codes to different terminals), or some other multiplexing schemes, including combinations of the aforementioned techniques.

For simplicity, various aspects and embodiments of the invention have been described for a system in which each terminal includes one antenna. However, the techniques described herein may also be applied to a MIMO system that includes any combination of single-antenna terminals (i.e., SIMO terminals) and multiple-antenna terminals (i.e., MIMO terminals). For example, a base station with four receive antennas may support transmissions from (1) a single 4×4 MIMO terminal, (2) two 2×4 MIMO terminals, (3) four 1×4 SIMO terminals, (4) one 2×4 MIMO terminals and two 1×4 SIMO terminals, or any other combination of terminals. The scheduler may be designed to select the best combination of terminals based on the hypothesized post-processed SNRs for an assumed set of simultaneous transmitting terminals, where the set can include any combination of SIMO and MIMO terminals.

The scheduling schemes described herein determine the SNRs for the terminals based on a particular transmit power level from the terminals. For simplicity, the same transmit power level is assumed for all terminals (i.e., no power control of the transmit power). However, by controlling the transmit power of the terminals, the achievable SNRs may be adjusted. For example, by decreasing the transmit power of a particular terminal via power control, the SNR for this terminal is reduced, the interference due to this terminal would also be reduced, and other terminals may be able to achieve better SNRs. Thus, power control may also be used in conjunction with the scheduling schemes described herein, and this is within the scope of the invention.

The scheduling of terminals based on priority is also described in U.S. patent application Ser. No. 09/675,706, entitled "METHOD AND APPARATUS FOR DETERMINING AVAILABLE TRANSMIT POWER IN A WIRELESS COMMUNICATION SYSTEM," filed Sep. 29, 2000. Scheduling of data transmission for the uplink is also described in U.S. Pat. No. 5,923,650, entitled "METHOD AND APPARATUS FOR REVERSE LINK RATE SCHEDULING," issued Jul. 13, 1999, and incorporated herein by reference.

The scheduling schemes described herein incorporate a number of features and provide numerous advantages. Some of these features and advantages are described below.

First, the scheduling schemes support "mix mode operation" whereby any combination of SIMO and MIMO terminals may be scheduled to transmit on the reverse link. Each SIMO terminal is associated with a channel estimate vector $\underline{h}$ shown in equation (1), and each MIMO terminal is associated with a set of vectors $\underline{h}$, one vector for each transmit antenna and which may further correspond to an available transmission channel. The vectors for the terminals in each set may be ordered in the manner described above and evaluated.

Second, the scheduling schemes provide a schedule for each transmission interval that includes a set of (optimal or near optimal) "mutually compatible" terminals based on their spatial signatures. Mutual compatibility may be taken to mean coexistence of transmission on the same channel and at the same time given specific constraints regarding terminals data rate requirements, transmit power, link margin, capability between SIMO and MIMO terminals, and possibly other factors.

Third, the scheduling schemes support variable data rate adaptation based on the SNRs of the post-processed signals transmitted by the terminals. Each scheduled terminal is informed when to communicate, which data rate(s) to use (e.g., on a per transmit antenna basis), and the particular mode (e.g., SIMO, MIMO).

Fourth, the scheduling schemes can be designed to consider sets of terminals that have similar link margins. Terminals may be grouped according to their link margin properties. The scheduler may then consider combinations of terminals in the same "link margin" group when searching for mutually compatible spatial signatures. This grouping according to link margin may improve the overall spectral efficiency of the scheduling schemes compared to that achieved by ignoring the link margins. Moreover, by scheduling terminals with similar link margins to transmit, uplink power control may be more easily exercised (e.g., on the entire set of terminals) to improve overall spectral reuse. This may be viewed as a combination of the uplink adaptive reuse scheduling in combination with spatial division multiple access (SDMA) for SIMO/MIMO. Scheduling based on link margins is described in further detail in U.S. patent application Ser. No. 09/532,492, entitled "METHOD AND APPARATUS FOR CONTROLLING TRANSMISSIONS OF A COMMUNICATIONS SYSTEM," filed Mar. 30, 2000, and U.S. patent application Ser. No. 09/848,937, entitled "METHOD AND APPARATUS FOR CONTROLLING UPLINK TRANSMISSIONS OF A WIRELESS COMMUNICATION SYSTEM," filed May 3, 2001, both assigned to the assignee of the present application and incorporated herein by reference.

Fifth, the scheduling schemes may take into account the particular order in which terminals are processed when a successive cancellation receiver processing scheme is used at the base station. The successive cancellation receiver processing scheme provides improved SNRs for the post-processed signals, and the achievable SNRs are dependent on the order in which the transmitted signals are processed. The scheduling schemes can be used to optimize the order in which transmitted signals are processed. Since the processing order impacts the post-processed SNR, this allows the scheduler extra degrees of freedom.

Performance

The use of successive cancellation receiver processing technique at the base station to process multiple SIMO and/or MIMO transmissions from a number of terminals provides improved system performance (e.g., higher throughput). Simulations have been performed to quantify the possible improvement in system throughput with some of these techniques. In the simulation, the channel response matrix H coupling the array of transmit antennas and receive antennas is assumed to be composed of equal-variance, zero-mean Gaussian random variables (i.e., "independent complex Gaussian assumption"). The average throughput for a random selection of $N_T$ $1 \times N_R$ channels is assessed. Note that throughput is taken to be 50% of the channel capacity as determined by Shannon's theoretical capacity limit.

Figure 9A:
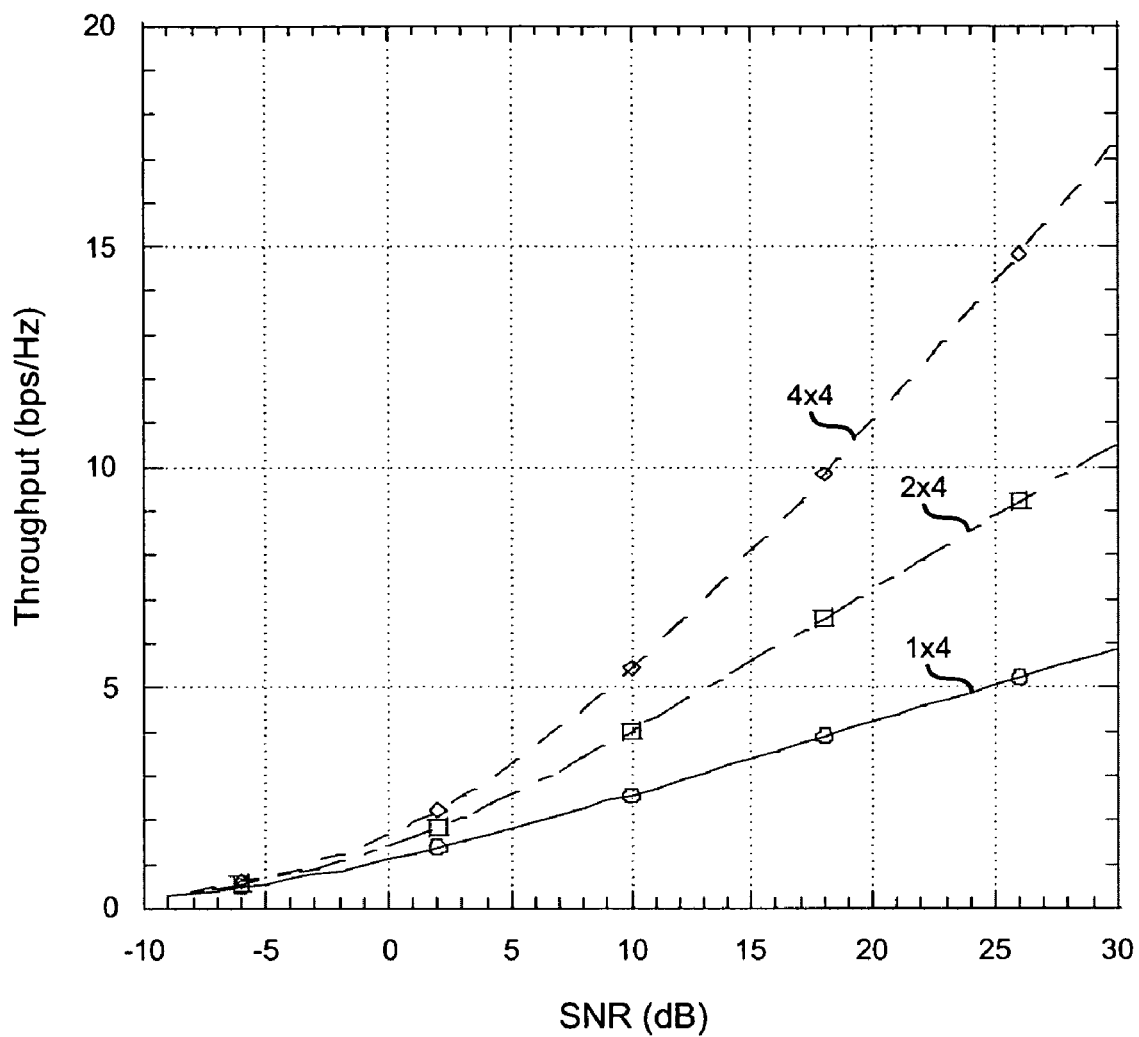
FIGS. 9A and 9B show the average throughput and the sensitivity in cell throughput, respectively, for a simulated network.

FIG. 9A shows the average throughput associated with four receive antennas (i.e., $N_R=4$) and various number of single-antenna terminals (i.e., $N_T=1$, 2 and 4) for an independent complex Gaussian assumption in an interference limited environment (i.e., the interference power is much greater than the thermal noise power). The case of four transmit antennas (i.e., $N_T=4$) has greater capacity than the case of one transmit antenna (i.e., $N_T=1$), with the gains increasing with SNR. At very high SNR, the capacity of the $N_T=4$ case approaches four times that of the $N_T=1$ case. At very low SNRS, the gain between these two cases reduces and becomes negligible.

In a low or no interference environment (e.g., thermal noise limited), the throughput of the $N_T=4$ case is even greater than that shown in FIG. 9A. In the thermal noise limited environment, the interference power is low (e.g., zero) and the SNR achieved is essentially 6 dB greater than that given in FIG. 9A for the $N_T=4$ case. As an example, when a single terminal is received at an SNR of 10 dB, the average throughput achieved for this terminal is 2.58 bps/Hz. When four terminals are permitted to transmit simultaneously, the total throughput achieved is equivalent to the $N_T=4$ curve at an SNR=10 dB+10·$\log_{10}(4)$=16 dB. Thus, in the thermal noise limited environment, the total throughput for four terminals is 8.68 bps/Hz or approximately 3.4 times that of a single terminal transmitting.

In interference limited systems such as a cellular network, the throughput per cell afforded with multiple SIMO transmissions in conjunction with the SC receiver processing at the base station is a function of the SNR setpoint selected for the terminals. For example, at 10 dB SNR, the capacity is more than doubled when four 1×4 SIMO terminals are allowed to transmit simultaneously. At 20 dB SNR, the capacity increases a factor of 2.6 times that achieved with a single 1×4 terminal. However, the higher operating setpoint typically implies a larger frequency reuse factor. That is, the fraction of cells using the same frequency channel simultaneously may need to be reduced to achieve the required SNR corresponding to the higher operating setpoints, which may then cause the overall spectral efficiency (as measured in bps/Hz/cell) to decrease. In maximizing network capacity for this scheme, there is thus a basic tradeoff between the selection of the particular operating setpoint and the required frequency reuse factor.

Figure 9B:
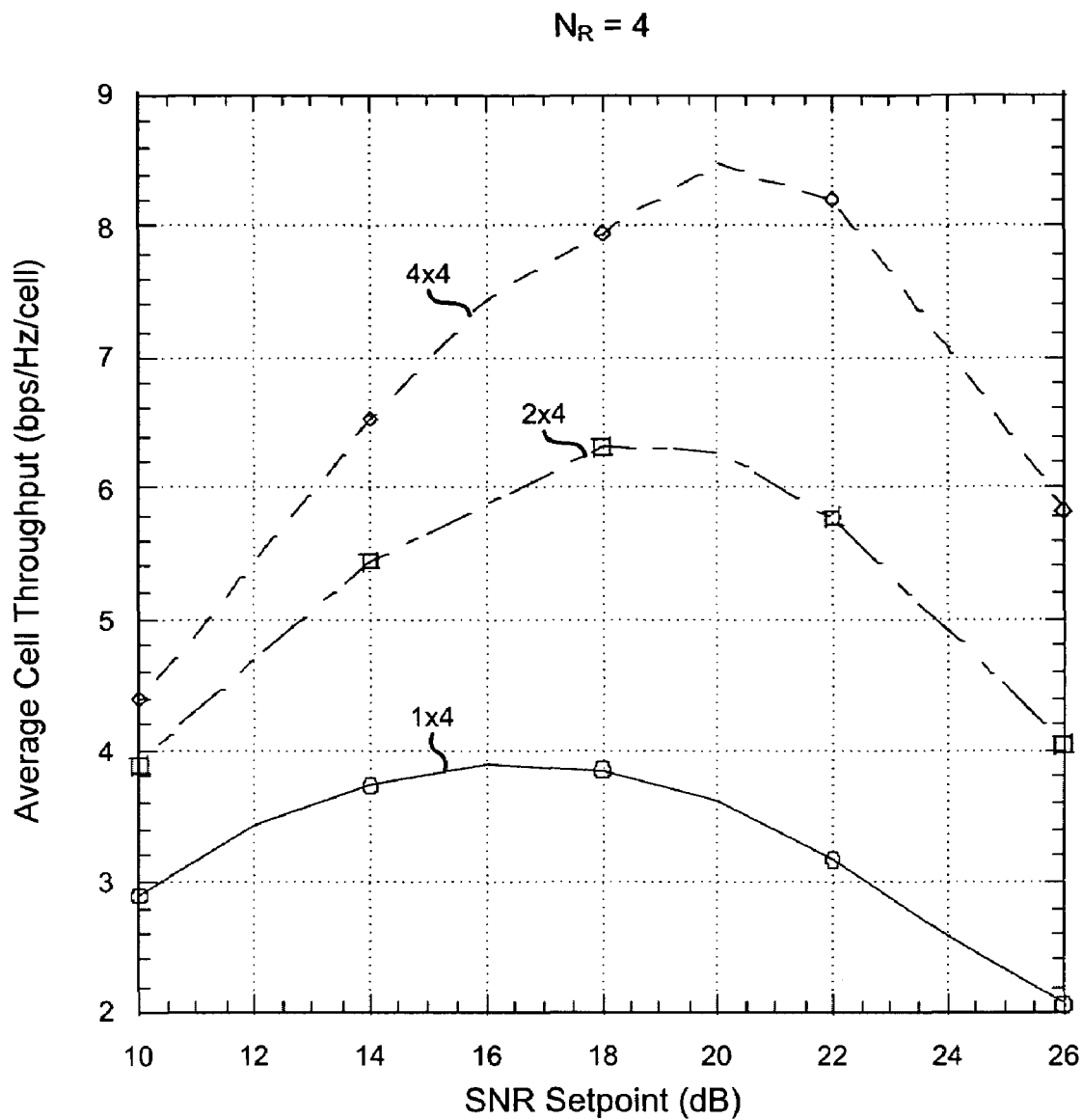

FIG. 9B shows the sensitivity in cell throughput for a simulated network of cells with $N_T=1$, 2, and 4 simultaneous terminals. Each cell site employs $N_R=4$ receive antennas. All terminals are power controlled to achieve a given setpoint. Inspection shows that there exists a range of SNR setpoints for which the cell throughput for $N_T=4$ terminals is more than double that achieved when only a single terminal is allowed to transmit.

Various innovative techniques described herein may also be applied for scheduling downlink data transmissions.

MIMO Communication System

Figure 5:
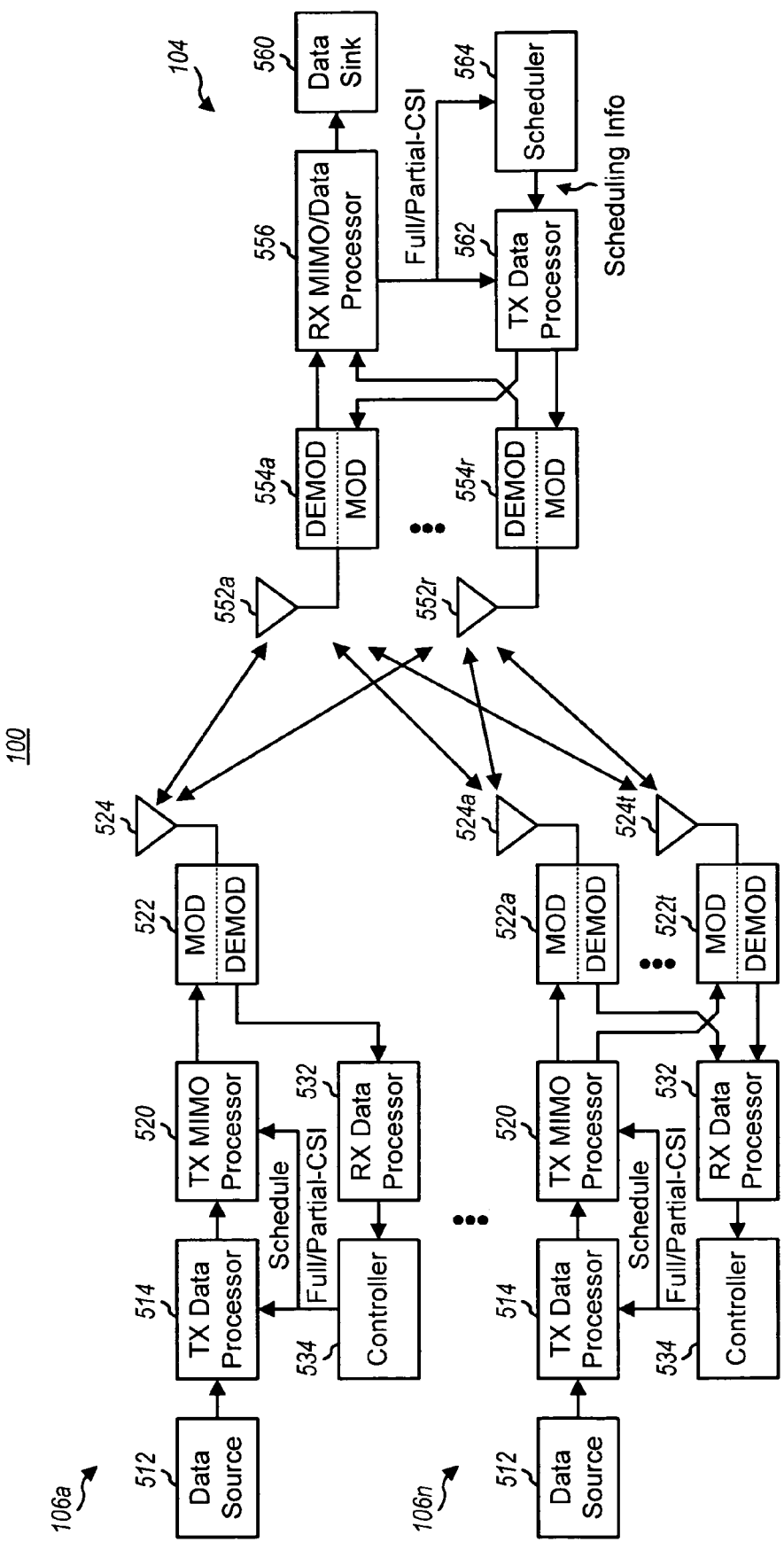
FIG. 5 is a simplified block diagram of a number of terminals and a base station in the MIMO system shown in FIG. 1.

FIG. 5 is a block diagram of base station 104 and terminals 106 within MIMO communication system 100. At a scheduled terminal 106, a data source 512 provides data (i.e., information bits) to a transmit (TX) data processor 514. For each transmit antenna assigned for data transmission, TX data processor 514 (1) encodes the data in accordance with a particular coding scheme, (2) interleaves (i.e., reorders) the coded data based on a particular interleaving scheme, and (3) maps the interleaved bits into modulation symbols. The encoding increases the reliability of the data transmission. The interleaving provides time diversity for the coded bits, permits the data to be transmitted based on an average SNR for the transmit antenna, combats fading, and further removes correlation between coded bits used to form each modulation symbol. The interleaving may further provide frequency diversity if the coded bits are transmitted over multiple frequency subchannels. In an aspect, the coding and symbol mapping may be performed based on control signals provided by a controller 534.

The encoding, interleaving, and signal mapping may be achieved based on various schemes. Some such schemes are described in U.S. patent application Ser. No. 09/854,235, entitled "METHOD AND APPARATUS FOR PROCESSING DATA IN A MULTIPLE-INPUT MULTIPLE-OUTPUT (MIMO) COMMUNICATION SYSTEM UTILIZING CHANNEL STATE INFORMATION," filed May 11, 2001; U.S. patent application Ser. No. 09/826,481, entitled "METHOD AND APPARATUS FOR UTILIZING CHANNEL STATE INFORMATION IN A WIRELESS COMMUNICATION SYSTEM," filed Mar. 23, 2001; and U.S. patent application Ser. No. 09/776,075, entitled "CODING SCHEME FOR A WIRELESS COMMUNICATION," filed Feb. 1, 2001, all assigned to the assignee of the present application and incorporated herein by reference.

If multiple transmit antennas are used for data transmission, TX MIMO processor 520 receives and demultiplexes the modulation symbols from TX data processor 514 and provides a stream of modulation symbols for each transmission channel (e.g., each transmit antenna), one modulation symbol per time slot. TX MIMO processor 520 may further precondition the modulation symbols for each selected transmission channel if full CSI (e.g., the channel response matrix H) is available. MIMO and full-CSI processing is described in further detail in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, assigned to the assignee of the present application and incorporated herein by reference.

If OFDM is not employed, TX MIMO processor 520 provides a stream of modulation symbols for each antenna used for data transmission. And if OFDM is employed, TX MIMO processor 520 provides a stream of modulation symbol vectors for each antenna used for data transmission. And if full-CSI processing is performed, TX MIMO processor 520 provides a stream of preconditioned modulation symbols or preconditioned modulation symbol vectors for each antenna used for data transmission. Each stream is then received and modulated by a respective modulator (MOD) 522 and transmitted via an associated antenna 524.

At base station 104, a number of receive antennas 552 receive the transmitted signals, and each receive antenna provides a received signal to a respective demodulator (DEMOD) 554. Each demodulator (or front-end unit) 554 performs processing complementary to that performed at modulator 522. The modulation symbols from all demodulators 554 are then provided to a receive (RX) MIMO/data processor 556 and processed to recover the data streams transmitted by the scheduled terminals. RX MIMO/data processor 556 performs processing complementary to that performed by TX data processor 514 and TX MIMO processor 520 and provides decoded data to a data sink 560. In an embodiment, RX MIMO/data processor 556 implements the successive cancellation receiver processing technique to provide improved performance. The processing by base station 104 is described in further detail in the aforementioned U.S. patent application Ser. Nos. 09/854,235 and 09/776,075.

For each active terminal 106, RX MIMO/data processor 556 further estimates the link conditions and derives CSI (e.g., post-processed SNRs or channel gain estimates). The CSI is then provided to a TX data processor 562 and a scheduler 564.

Scheduler 564 uses the CSI to perform a number of functions such as (1) selecting the set of best terminals for data transmission, (2) determining the particular order in which the signals from the selected terminals are to be recovered, and (3) determining the coding and modulation scheme to be used for each transmit antenna of each scheduled terminal. Scheduler 564 may schedule terminals to achieve high throughput or based on some other performance criteria or metrics, as described above. For each scheduling interval, scheduler 564 provides a schedule that indicates which active terminals have been selected for data transmission and the assigned transmission parameters for each schedule terminal. The transmission parameters for each assigned transmit antenna of each scheduled terminal may include the date rate and coding and modulation schemes to be used. In FIG. 5, scheduler 564 is shown as being implemented within base station 104. In other implementation, scheduler 564 may be implemented within some other element of communication system 100 (e.g., a base station controller that couples to and interacts with a number of base stations).

A TX data processor 562 receives and processes the schedule, and provides processed data indicative of the schedule to one or more modulators 554. Modulator(s) 554 further condition the processed data and transmit the schedule to the terminals via a forward channel. The schedule may be reported by the terminal using various signaling and messaging techniques.

At each active terminal 106, the transmitted scheduling signal is received by antennas 524, demodulated by demodulators 522, and provided to a RX data processor 532. RX data processor 532 performs processing complementary to that performed by TX data processor 562 and recovers the schedule for that terminal (if any), which is then provided to controller 534 and used to control the data transmission by the terminal.

Figure 6:
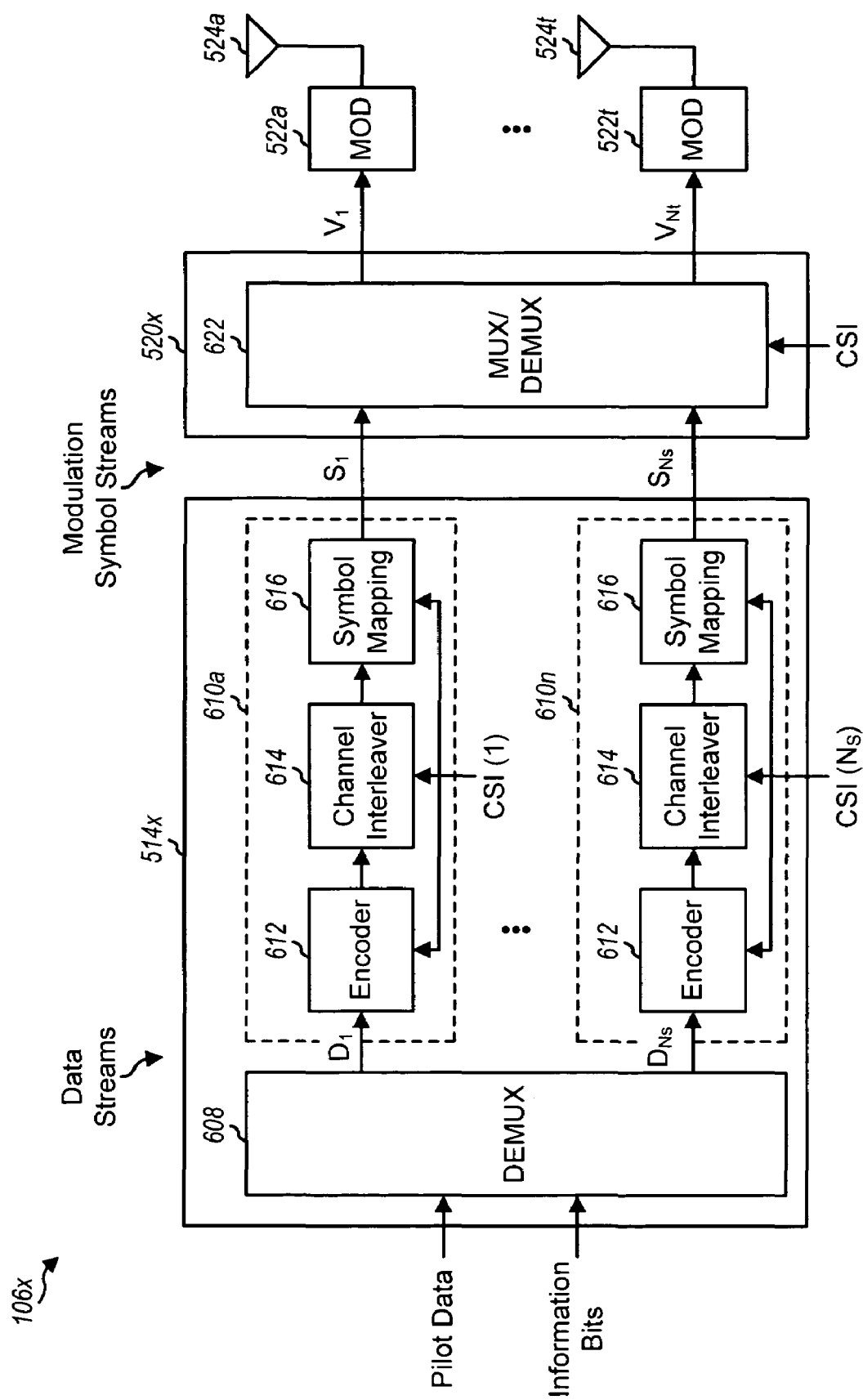
FIG. 6 is a block diagram of an embodiment of the transmit portion of a terminal capable of processing data for transmission to the base station based on the available CSI.

FIG. 6 is a block diagram of an embodiment of a terminal 106x capable of processing data for transmission to the base station based on CSI available to the terminal (e.g., as reported in the schedule by the base station). Terminal 106x is one embodiment of the transmitter portion of terminal 106 in FIG. 5. Terminal 106x includes (1) a TX data processor 514x that receives and processes information bits to provide modulation symbols and (2) a TX MIMO processor 520x that demultiplexes the modulation symbols for the $N_T$ transmit antennas.

In the specific embodiment shown in FIG. 6, TX data processor 514x includes a demultiplexer 608 coupled to a number of channel data processors 610, one processor for each of the $N_S$ transmission channels assigned for data transmission. Demultiplexer 608 receives and demultiplexes the aggregate information bits into a number of (up to $N_S$) data streams, one data stream for each assigned transmission channel. Each data stream is provided to a respective channel data processor 610.

In the embodiment shown in FIG. 6, each channel data processor 610 includes an encoder 612, a channel interleaver 614, and a symbol mapping element 616. Encoder 612 receives and encodes the information bits in the received data stream in accordance with a particular coding scheme to provide coded bits. Channel interleaver 614 interleaves the coded bits based on a particular interleaving scheme to provide time diversity. And symbol mapping element 616 maps the interleaved bits into modulation symbols for the transmission channel used for transmitting the data stream.

Pilot data (e.g., data of known pattern) may also be encoded and multiplexed with the processed information bits. The processed pilot data may be transmitted (e.g., in a time division multiplexed (TDM) manner) in all or a subset of the transmission channels used to transmit the information bits. The pilot data may be used at the base station to perform channel estimation.

As shown in FIG. 6, the data encoding, interleaving, and modulation (or a combination thereof) may be adjusted based on the available CSI (e.g., as reported by the base station). In one coding and modulation scheme, adaptive encoding is achieved by using a fixed base code (e.g., a rate ⅓ Turbo code) and adjusting the puncturing to achieve the desired code rate, as supported by the SNR of the transmission channel used to transmit the data. For this scheme, the puncturing may be performed after the channel interleaving. In another coding and modulation scheme, different coding schemes may be used based on the reported CSI. For example, each of the data streams may be coded with an independent code. With this scheme, a successive cancellation receiver processing scheme may be used at the base station to detect and decode the data streams to derive a more reliable estimate of the transmitted data streams, as described in further detail below.

Symbol mapping element 616 can be designed to group sets of interleaved bits to form non-binary symbols, and to map each non-binary symbol into a point in a signal constellation corresponding to a particular modulation scheme (e.g., QPSK, M-PSK, M-QAM, or some other scheme) selected for the transmission channel. Each mapped signal point corresponds to a modulation symbol. The number of information bits that may be transmitted for each modulation symbol for a particular level of performance (e.g., one percent packet error rate (PER)) is dependent on the SNR of the transmission channel. Thus, the coding and modulation scheme for each transmission channel may be selected based on the available CSI. The channel interleaving may also be adjusted based on the available CSI.

The modulation symbols from TX data processor 514x are provided to TX MIMO processor 520x, which is one embodiment of TX MIMO processor 520 in FIG. 5. Within TX MIMO processor 520x, a demultiplexer 622 receives (up to) $N_S$ modulation symbol streams from $N_S$ channel data processors 610 and demultiplexes the received modulation symbols into a number of ($N_T$) modulation symbol streams, one stream for each antenna used to transmit the modulation symbols. Each modulation symbol stream is provided to a respective modulator 522. Each modulator 522 converts the modulation symbols into an analog signal, and further amplifies, filters, quadrature modulates, and upconverts the signal to generate a modulated signal suitable for transmission over the wireless link.

A transmitter design that implements OFDM is described in the aforementioned U.S. patent application Ser. Nos. 09/54,235, 09/826,481, 09/776,075, and 09/532,492.

Figure 7:
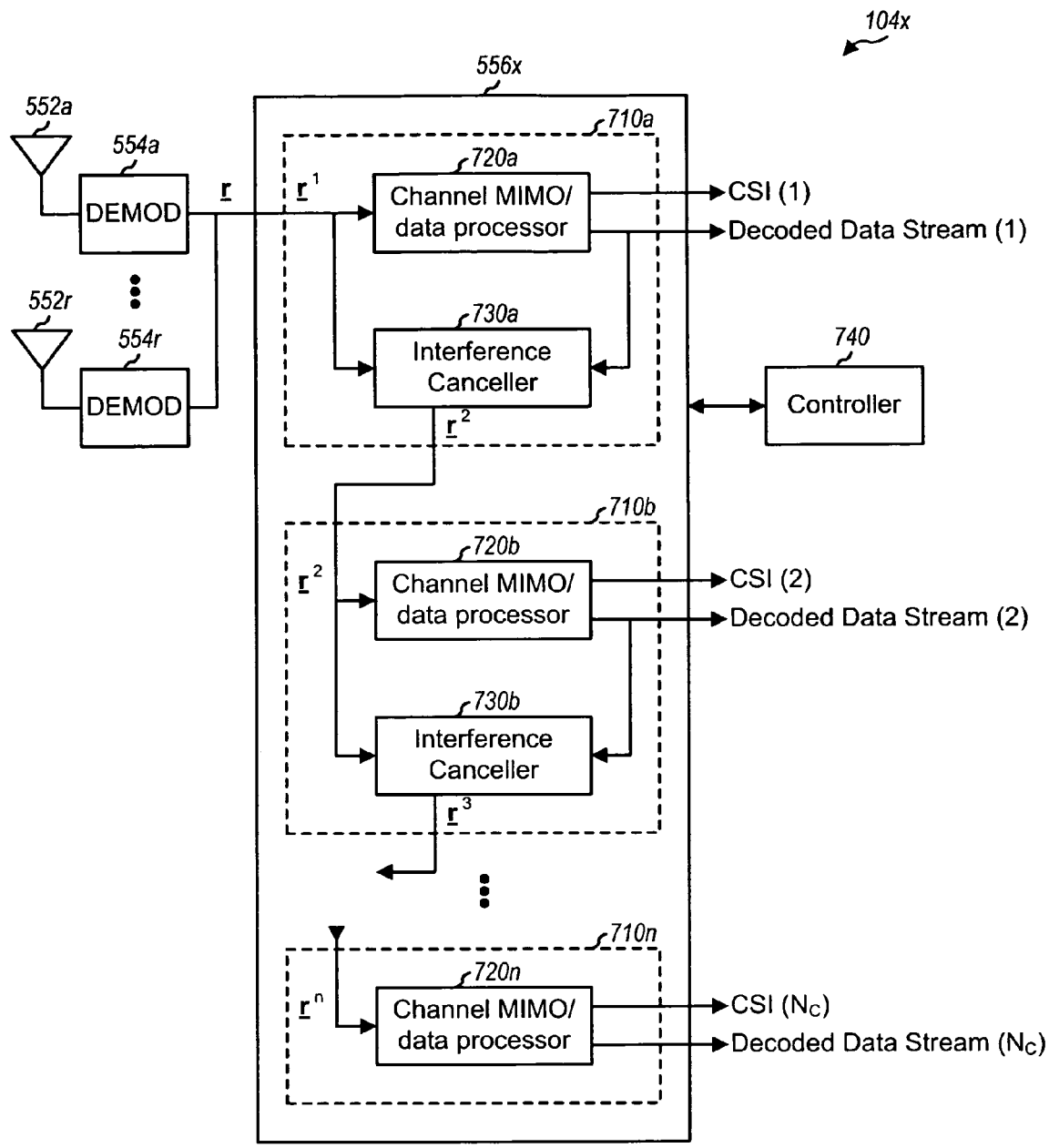
FIG. 7 is a block diagram of an embodiment of the receive portion of a base station.

FIG. 7 is a block diagram of an embodiment of base station 104x capable of implementing various aspects and embodiments of the invention. Base station 104x is one specific embodiment of the receive portion of base station 104 in FIG. 5 and implements the successive cancellation receiver processing technique to receive and recover the signals transmitted by the scheduled terminals. The transmitted signals from the terminals are received by each of $N_R$ antennas 552a through 552r and routed to a respective demodulator (DEMOD) 554 (which is also referred to as a front-end processor). Each demodulator 554 conditions (e.g., filters and amplifies) a respective received signal, downconverts the conditioned signal to an intermediate frequency or baseband, and digitizes the downconverted signal to provide samples. Each demodulator 554 may further demodulate the samples with a received pilot to generate a stream of received modulation symbols, which is provided to a RX MIMO/data processor 556x.

In the embodiment shown in FIG. 7, RX MIMO/data processor 556x (which is one embodiment of RX MIMO/data processor 556 in FIG. 5) includes a number of successive (i.e., cascaded) receiver processing stages 710, one stage for each of the transmitted data stream to be recovered by base station 104x. In one transmit processing scheme, one data stream is transmitted on each transmission channel assigned for data transmission, and each data stream is independently processed (e.g., with its own coding and modulation scheme) and transmitted from a respective transmit antenna. For this transmit processing scheme, the number of data streams to be recovered is equal to the number of assigned transmission channels, which is also equal to the number of transmit antennas used for data transmission by the scheduled terminals. For clarity, RX MIMO/data processor 556x is described for this transmit processing scheme.

Each receiver processing stage 710 (except for the last stage 710n) includes a channel MIMO/data processor 720 coupled to an interference canceller 730, and the last stage 710n includes only channel MIMO/data processor 720n. For the first receiver processing stage 710a, channel MIMO/data processor 720a receives and processes the $N_R$ modulation symbol streams from demodulators 554a through 554r to provide a decoded data stream for the first transmission channel (or the first transmitted signal). And for each of the second through last stages 710b through 710n, channel MIMO/data processor 720 for that stage receives and processes the $N_R$ modified symbol streams from the interference canceller 720 in the preceding stage to derive a decoded data stream for the transmission channel being processed by that stage. Each channel MIMO/data processor 720 further provides CSI (e.g., the SNR) for the associated transmission channel.

For the first receiver processing stage 710a, interference canceller 730a receives the $N_R$ modulation symbol streams from all $N_R$ demodulators 554. And for each of the second through second-to-last stages, interference canceller 730 receives the $N_R$ modified symbol streams from the interference canceller in the preceding stage. Each interference canceller 730 also receives the decoded data stream from channel MIMO/data processor 720 within the same stage, and performs the processing (e.g., coding, interleaving, modulation, channel response, and so on) to derive $N_R$ remodulated symbol streams that are estimates of the interference components of the received modulation symbol streams due to this decoded data stream. The remodulated symbol streams are then subtracted from the received modulation symbol streams to derive $N_R$ modified symbol streams that include all but the subtracted (i.e., canceled) interference components. The $N_R$ modified symbol streams are then provided to the next stage. The order in which the transmitted signals are recovered is determined by the schedule, which may have taken into account the performance achieved by a specific order of processing to select the date rate and coding and modulation scheme for each transmitted signal.

In FIG. 7, a controller 740 is shown coupled to RX MIMO/data processor 556x and may be used to direct various steps in the successive cancellation receiver processing performed by processor 556x.

FIG. 7 shows a receiver structure that may be used in a straightforward manner when each data stream is transmitted over a respective transmit antenna (i.e., one data stream corresponding to each transmitted signal). In this case, each receiver processing stage 710 may be operated to recover one of the transmitted signals and provide the decoded data stream corresponding to the recovered transmitted signal. For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the transmitted signal on each transmit antenna of each frequency subchannel. Modulation symbols for multiple transmit antennas, frequency subchannels, and/or time intervals may then be combined in a complementary manner as the demultiplexing performed at the terminal. The stream of combined modulation symbols is then processed to provide the corresponding decoded data stream.

Figure 8A:
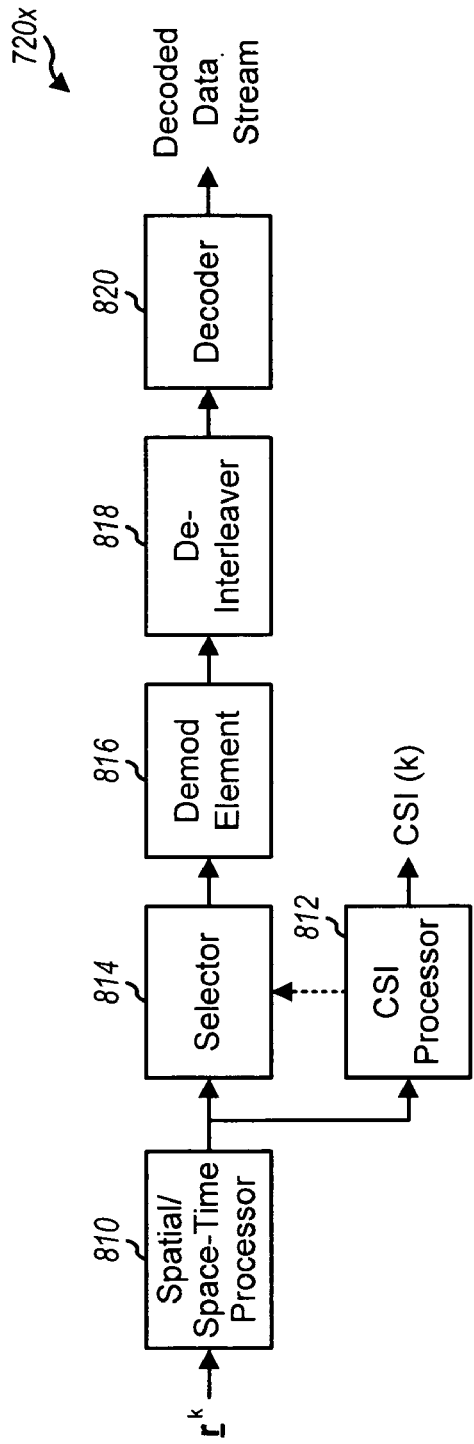
FIGS. 8A and 8B are block diagrams of an embodiment of a channel MIMO/data processor and an interference canceller, respectively, of a receive (RX) MIMO/data processor at the base station.

FIG. 8A is a block diagram of an embodiment of channel MIMO/data processor 720x, which is one embodiment of channel MIMO/data processor 720 in FIG. 7. In this embodiment, channel MIMO/data processor 720x includes a spatial/space-time processor 810, a CSI processor 812, a selector 814, a demodulation element 818, a de-interleaver 818, and a decoder 820.

Spatial/space-time processor 810 performs linear spatial processing on the $N_R$ received signals for a non-dispersive MIMO channel (i.e., with flat fading) or space-time processing on the $N_R$ received signals for a dispersive MIMO channel (i.e., with frequency selective fading). The spatial processing may be achieved using linear spatial processing techniques such as a channel correlation matrix inversion (CCMI) technique, a minimum mean square error (MMSE) technique, and others. These techniques may be used to null out the undesired signals or to maximize the received SNR of each of the constituent signals in the presence of noise and interference from the other signals. The space-time processing may be achieved using linear space-time processing techniques such as a MMSE linear equalizer (MMSE-LE), a decision feedback equalizer (DFE), a maximum-likelihood sequence estimator (MLSE), and others. The CCMI, MMSE, MMSE-LE, and DFE techniques are described in further detail in the aforementioned U.S. patent application Ser. No. 09/854,235. The DFE and MLSE techniques are also described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

CSI processor 812 determines the CSI for each of the transmission channels used for data transmission. For example, CSI processor 812 may estimate a noise covariance matrix based on the received pilot signals and then compute the SNR of the k-th transmission channel used for the data stream to be decoded. The SNR can be estimated similar to conventional pilot assisted single and multi-carrier systems, as is known in the art. The SNR for all transmission channels used for data transmission may comprise the CSI that is used by the base station to schedule data transmission. In certain embodiments, CSI processor 812 may further provide to selector 814 a control signal that identifies the particular data stream to be recovered by this receiver processing stage.

Selector 814 receives a number of symbol streams from spatial/space-time processor 810 and extracts the symbol stream corresponding to the data stream to be decoded. The extracted stream of modulation symbols is then provided to a demodulation element 814.

For the embodiment shown in FIG. 6 in which the data stream for each transmission channel is independently coded and modulated based on the channel's SNR, the recovered modulation symbols for the selected transmission channel are demodulated in accordance with a demodulation scheme (e.g., M-PSK, M-QAM) that is complementary to the modulation scheme used for the transmission channel. The demodulated data from demodulation element 816 is then de-interleaved by a de-interleaver 818 in a complementary manner to that performed by channel interleaver 614, and the de-interleaved data is further decoded by a decoder 820 in a complementary manner to that performed by encoder 612. For example, a Turbo decoder or a Viterbi decoder may be used for decoder 820 if Turbo or convolutional coding, respectively, is performed at the terminal. The decoded data stream from decoder 820 represents an estimate of the transmitted data stream being recovered.

Figure 8B:
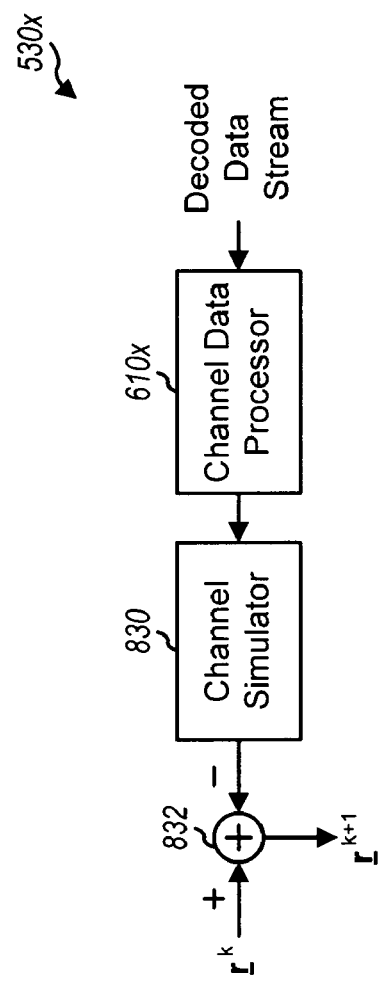

FIG. 8B is a block diagram of an interference canceller 730x, which is one embodiment of interference canceller 730 in FIG. 7. Within interference canceller 730x, the decoded data stream from the channel MIMO/data processor 720 within the same stage is re-encoded, interleaved, and re-modulated by a channel data processor 610x to provide remodulated symbols, which are estimates of the modulation symbols at the terminal prior to the MIMO processing (if any) and channel distortion. Channel data processor 610x performs the same processing (e.g., encoding, interleaving, and modulation) as that performed at the terminal for the data stream. The remodulated symbols are then provided to a channel simulator 830, which processes the symbols with the estimated channel response to provide estimates, $\hat{\imath}^k$, of the interference due the decoded data stream. The channel response estimate may be derived based on the pilot and/or data transmitted by the active terminals and in accordance with the techniques described in the aforementioned U.S. patent application Ser. No. 09/854,235.

The $N_R$ elements in the interference vector $\hat{\imath}^k$ correspond to the component of the received signal at each of the $N_R$ receive antennas due to symbol stream transmitted on the k-th transmit antenna. Each element of the vector represents an estimated component due to the decoded data stream in the corresponding received modulation symbol stream. These components are interference to the remaining (not yet detected) transmitted signals in the $N_R$ received modulation symbol streams (i.e., the vector $\underline{r}^k$), and are subtracted (i.e., canceled) from the received signal vector $\underline{r}^k$ by a summer 832 to provide a modified vector $\underline{r}^{k+1}$ having the components from the decoded data stream removed. The modified vector $\underline{r}^{k+1}$ is provided as the input vector to the next receiver processing stage, as shown in FIG. 7.

Various aspects of the successive cancellation receiver processing are described in further detail in the aforementioned U.S. patent application Ser. No. 09/854,235.

Receiver designs that do not employ the successive cancellation receiver processing technique may also be used to receive, process, and recover the transmitted data streams. Some such receiver designs are described in the aforementioned U.S. patent application Ser. Nos. 09/776,075 and 09/826,481, and U.S. patent application Ser. No. 09/539,157, entitled "HIGH EFFICIENCY, HIGH PERFORMANCE COMMUNICATIONS SYSTEM EMPLOYING MULTI-CARRIER MODULATION," filed Mar. 30, 2000, assigned to the assignee of the present invention and incorporated herein by reference.

As used herein, the CSI may comprise any type of information that is indicative of the characteristics of the communication link. Various types of information may be provided as CSI for each scheduled terminal, and the CSI may be provided to the terminals in the schedule.

In one embodiment, the CSI comprises a data rate indicator for each transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate is then mapped to and represented by a data rate indicator (DRI), which can be efficiently coded. For example, if (up to) seven possible data rates are supported, then a 3-bit value may be used to represent the DRI where, e.g., a zero may indicate a data rate of zero (i.e., no data transmission) and 1 through 7 may be used to indicate seven different data rates. In a typical implementation, the quality measurements (e.g., SNR estimates) are mapped directly to the DRI based on, e.g., a look-up table.

In another embodiment, the CSI comprises an indication of the particular processing scheme to be used at each scheduled terminal for each transmit data stream. In this embodiment, the indicator may identify the particular coding scheme and the particular modulation scheme to be used for the transmit data stream such that the desired level of performance is achieved.

In yet another embodiment, the CSI comprises signal-to-noise-plus-interference ratio (SNR), which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the CSI comprises power control information for each transmission channel. The power control information may include a single bit for each transmission channel to indicate a request for either more power or less power, or it may include multiple bits to indicate the magnitude of the change of power level requested. In this embodiment, the terminals may make use of the power control information fed back from the base station to adjust the data processing and/or the transmit power.

In yet another embodiment, the CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate to increase or decrease the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

In yet another embodiment, the CSI comprises signal power and interference plus noise power. These two components may be separately derived and provided for each transmission channel used for data transmission.

In yet another embodiment, the CSI comprises signal power, interference power, and noise power. These three components may be derived and provided for each transmission channel used for data transmission.

In yet another embodiment, the CSI comprises signal-to-noise ratio plus a list of interference powers for each observable interference term. This information may be derived and provided for each transmission channel used for data transmission.

In yet another embodiment, the CSI comprises signal components in a matrix form (e.g., $N_T \times N_R$ complex entries for all transmit-receive antenna pairs) and the noise plus interference components in matrix form (e.g., $N_T \times N_R$ complex entries). The terminal may then properly combine the signal components and the noise plus interference components for the appropriate transmit-receive antenna pairs to derive the quality for each transmission channel used for data transmission (e.g., the post-processed SNR for each transmitted data stream, as received at the base station).

Other forms of CSI may also be used and are within the scope of the invention. In general, the CSI includes sufficient information in whatever form that may be used to adjust the processing at each scheduled terminal such that the desired level of performance is achieved for the transmitted data streams.

The CSI may be derived based on the signals transmitted from the terminal and received at the base station. In an embodiment, the CSI is derived based on a pilot reference included in the transmitted signals. Alternatively or additionally, the CSI may be derived based on the data included in the transmitted signals.

In yet another embodiment, the CSI comprises one or more signals transmitted on the downlink from the base station to the terminals. In some systems, a degree of correlation may exist between the uplink and downlink (e.g. time division duplexed (TDD) systems where the uplink and downlink share the same band in a time division multiplexed manner). In these systems, the quality of the uplink may be estimated (to a requisite degree of accuracy) based on the quality of the downlink, which may be estimated based on a signal (e.g., a pilot signal) transmitted from the base station. The pilot signal would then represent a means for which the terminals could estimate the CSI as observed at the base station.

The signal quality may be estimated at the base station based on various techniques. Some of these techniques are described in the following patents, which are assigned to the assignee of the present application and incorporated herein by reference:

U.S. Pat. No. 5,799,005, entitled "SYSTEM AND METHOD FOR DETERMINING RECEIVED PILOT POWER AND PATH LOSS IN A CDMA COMMUNICATION SYSTEM," issued Aug. 25, 1998, U.S. Pat. No. 5,903,554, entitled "METHOD AND APPARATUS FOR MEASURING LINK QUALITY IN A SPREAD SPECTRUM COMMUNICATION SYSTEM," issued May 11, 1999, U.S. Pat. Nos. 5,056,109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, and U.S. Pat. No. 6,097,972, entitled "METHOD AND APPARATUS FOR PROCESSING POWER CONTROL SIGNALS IN CDMA MOBILE TELEPHONE SYSTEM," issued Aug. 1, 2000.

Methods for estimating a single transmission channel based on a pilot signal or a data transmission may also be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999.

Various types of information for CSI and various CSI reporting mechanisms are also described in U.S. patent application Ser. No. 08/963,386, entitled "METHOD AND APPARATUS FOR HIGH RATE PACKET DATA TRANSMISSION," filed Nov. 3, 1997, assigned to the assignee of the present application, and in "TIE/EIA/IS-856 cdma2000 High Rate Packet Data Air Interface Specification", both of which are incorporated herein by reference.

The CSI may be reported to the scheduled terminal using various CSI transmission schemes. For example, the CSI may be sent in full, differentially, or a combination thereof. In one embodiment, CSI is reported periodically, and differential updates are sent based on the prior transmitted CSI. In another embodiment, the CSI is sent only when there is a change (e.g., if the change exceeds a particular threshold), which may lower the effective rate of the feedback channel. As an example, the date rate and/or coding and modulation scheme may be sent back (e.g., differentially) only when they change. Other compression and feedback channel error recovery techniques to reduce the amount of data to be fed back for CSI may also be used and are within the scope of the invention.

The elements of the transmitter and receiver systems may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the invention may be implemented with a combination of software and hardware. For example, computations for the symbol estimates for the linear spatial equalization, the space-time equalization, and the derivation of the channel SNR may be performed based on program codes executed on a processor (controllers 540 in FIG. 5).

For clarity, the receiver architecture shown in FIG. 5 includes a number of receiving processing stages, one stage for each data stream to be decoded. In some implementations, these multiple stages may be implemented with a single hardware unit or a single software module that is re-executed for each stage. In this manner, the hardware or software may be time shared to simplify the receiver design.

Headings are included herein for reference and to aid in the locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multiple-input multiple-output (MIMO) communication system, comprising:
   a base station comprising
      a plurality of front-end processors configured to process a plurality of signals received from a plurality of terminals to provide a plurality of symbol streams,
      at least one receive processor coupled to the front-end processors and configured to process the symbol streams in accordance with a successive cancellation receiver processing scheme to provide a plurality of decoded data streams, and to further derive channel state information (CSI) indicative of channel estimates for the plurality of terminals,
      a scheduler configured to receive the CSI, select a set of one or more terminals for data transmission on an uplink, assign a particular order of processing for the one or more selected terminals, and provide a schedule for the one or more selected terminals and their transmission parameters, and
      a transmit data processor operatively coupled to the receive processor and configured to process the schedule for transmission to the one or more selected terminals; and one or more terminals, each terminal comprising
- at least one demodulator configured to receive and process one or more signals from the base station to recover the transmitted schedule, and
- a transmit data processor configured to adaptively process data for transmission to the base station based on the transmission parameters for the terminal included in the recovered schedule.

2. The base station of claim 1, wherein the set of one or more transmission parameters for each selected terminal includes a coding and modulation scheme to be used for each data stream to be transmitted by the selected terminal.

3. A base station in a multiple-input multiple-output (MIMO) communication system, comprising:
- a plurality of front-end processors configured to process a plurality of signals received from a plurality of terminals to provide a plurality of received symbol streams;
- at least one receive processor coupled to the front-end processors and configured to process the received symbol streams to provide a plurality of decoded data streams and to derive channel state information (CSI) associated with the decoded data stream;
- a scheduler configured to receive the CSI, select a set of one or more terminals for data transmission on the uplink and provide a schedule for the one or more selected terminals and a set of one or more transmission parameters for each selected terminal; and
- a transmit processor configured to receive and process the schedule for transmission to the plurality of terminals, and
- wherein the one or more data streams from each scheduled terminal are adaptively processed prior to transmission based in part on the transmission parameters for the terminal included in the schedule.

4. The base station of claim 3, wherein the at least one receive processor is further operative to perform linear spatial processing on the received symbol streams.

5. The base station of claim 3, wherein the at least one receive processor is further operative to perform space-time processing on the received symbol streams.

6. The base station of claim 3, wherein the at least one receive processor is further operative to estimate a quality of each received symbol stream to derive the CSI for the associated decoded data stream.

7. The base station of claim 3, wherein the quality estimate is the signal-to-noise-plus-interference ratio (SNR) for the received symbol stream after spatial or space-time processing.

8. The base station of claim 3, wherein the set of one or more transmission parameters for each selected terminal includes a date rate for each data stream to be transmitted by the selected terminal.

9. The base station of claim 3, wherein each processing stage except a last stage includes
- a channel processor configured to process the input symbol streams to provide a decoded data stream, and
- an interference canceller configured to derive the modified symbol streams based on the decoded data stream and the input symbol streams.

10. The base station of claim 9, wherein each processing stage includes a channel quality estimator operative to estimate a quality of the recovered symbol stream to derive the CSI for the associated decoded data stream.

11. The base station of claim 9, wherein the channel quality estimator is operative to estimate the signal-to-noise-plus-interference ratio (SNR) for the recovered symbol stream.

12. A terminal in a multiple-input multiple-output (MIMO) communication system, comprising:
- at least one front-end processor configured to process at least one received signal to provide at least one received symbol stream;
- at least one receive processor coupled to the at least one front-end processor and configured to process the at least one received symbol stream to recover a schedule for the terminal, wherein the schedule include an indication of a particular time interval in which the terminal is scheduled for data transmission and a set of one or more transmission parameters to be used by the terminal for the data transmission;
- a transmit processor configured to receive and adaptively process data for transmission in accordance with the set of one or more transmission parameters, and
- wherein the terminal is one of one or more terminals included in a set scheduled for data transmission in the particular time interval, and wherein the set of one or more terminals scheduled for data transmission is selected from among one or more sets of terminals based on performance evaluated for each set.

* * * * *